US012580503B2

(12) United States Patent
Pennington, III et al.

(10) Patent No.: US 12,580,503 B2
(45) Date of Patent: Mar. 17, 2026

(54) POWER DISTRIBUTION WITHIN AN ELECTRIC MACHINE WITH RECTIFIED ROTOR WINDINGS

(71) Applicant: Tau Motors, Inc., Redwood City, CA (US)

(72) Inventors: Walter Wesley Pennington, III, Menlo Park, CA (US); Matthew J. Rubin, Indianapolis, IN (US); Gregory Gordon Stevenson, San Carlos, CA (US); Michael Parker Owen, St. Augustine, FL (US); Ethan Bagget Swint, Redwood City, CA (US); Matthias Preindl, New York, NY (US)

(73) Assignee: Tau Motors, Inc., Redwood City, CA (US)

( * ) Notice: Subject to any disclaimer, the term of this patent is extended or adjusted under 35 U.S.C. 154(b) by 154 days.

(21) Appl. No.: 18/592,660

(22) Filed: Mar. 1, 2024

(65) Prior Publication Data

US 2024/0204622 A1     Jun. 20, 2024

Related U.S. Application Data

(63) Continuation of application No. 18/179,743, filed on Mar. 7, 2023, now Pat. No. 12,003,144, which is a
(Continued)

(51) Int. Cl.
H02P 6/32          (2016.01)
H02K 1/14          (2006.01)
(Continued)

(52) U.S. Cl.
CPC ................ H02P 6/08 (2013.01); H02K 1/14 (2013.01); H02K 1/24 (2013.01); H02K 11/042 (2013.01);
(Continued)

(58) Field of Classification Search
CPC ...... H02P 6/32; H02P 6/00; H02P 6/08; H02P 6/10; H02P 6/28; H02P 7/00; H02P 9/14;
(Continued)

(56) References Cited

U.S. PATENT DOCUMENTS

| | | | |
|---|---|---|---|
| 7,358,698 B2 | 4/2008 | Seguchi et al. | |
| 8,102,091 B2 | 1/2012 | Ionel | |
| (Continued) | | | |

FOREIGN PATENT DOCUMENTS

| | | |
|---|---|---|
| CN | 103534913 | 1/2014 |
| JP | H08-205316 | 8/1996 |
| | (Continued) | |

OTHER PUBLICATIONS

Office Action in Australian Appln. No. 2024200951, mailed on Oct. 26, 2024, 3 pages.
(Continued)

*Primary Examiner* — Michael Andrews
(74) *Attorney, Agent, or Firm* — Fish & Richardson P.C.

(57)          ABSTRACT

An electric machine includes a stator defining multiple stator poles with associated stator windings configured to receive a stator current. The electric machine also includes a rotor defining multiple fixed rotor poles with associated rotor windings, wherein the rotor defines a field energizable by magnetic fields produced by the stator windings when receiving the stator current to produce relative motion between the rotor and the stator and wherein the rotor is maintained in synchronicity with the magnetic fields produced by the stator during operation of the electric machine. The electric machine also includes a rectification system configured control against an alternating current being induced in the rotor poles as the field is energized by magnetic fields produced by the stator windings when receiving the stator current.

20 Claims, 17 Drawing Sheets

Related U.S. Application Data continuation of application No. 17/634,715, filed as application No. PCT/US2021/044213 on Aug. 2, 2021, now Pat. No. 11,637,481.

(60) Provisional application No. 63/059,930, filed on Jul. 31, 2020.

(51) Int. Cl.

| | |
|---|---|
| *H02K 1/24* | (2006.01) |
| *H02K 11/042* | (2016.01) |
| *H02P 6/00* | (2016.01) |
| *H02P 6/08* | (2016.01) |
| *H02P 6/10* | (2006.01) |
| *H02P 6/28* | (2016.01) |

(52) U.S. Cl.
CPC .................. *H02P 6/00* (2013.01); *H02P 6/10* (2013.01); *H02P 6/28* (2016.02); *H02P 6/32* (2016.02)

(58) Field of Classification Search
CPC ........ H02P 9/38; H02P 21/22; H02P 21/0003; H02P 21/05; H02P 23/0004; H02P 23/04; H02P 25/00; H02P 25/022; H02P 2207/05; H02K 11/042; H02K 11/04; H02K 11/044; H02K 11/046; H02K 11/048; H02K 11/049; H02K 1/14; H02K 1/24; H02K 1/146; H02K 1/16; H02K 1/26
USPC ....................................................... 310/68 D
See application file for complete search history.

(56) References Cited

U.S. PATENT DOCUMENTS

| | | | |
|---|---|---|---|
| 8,400,088 | B2 | 3/2013 | De Belie et al. |
| 8,847,455 | B2 | 9/2014 | Hiramoto et al. |
| 8,922,087 | B1* | 12/2014 | Rittenhouse ........... H02K 29/03 |
| | | | 310/156.01 |
| 10,404,135 | B2 | 9/2019 | Rubin |
| 10,693,331 | B2 | 6/2020 | Lindner et al. |
| 11,637,481 | B1 | 4/2023 | Pennington, III et al. |
| 11,757,338 | B2 | 9/2023 | Pennington, III et al. |
| 11,936,255 | B2 | 3/2024 | Pennington, III et al. |
| 2004/0135539 | A1 | 7/2004 | Iwashita et al. |
| 2005/0006978 | A1 | 1/2005 | Bradfield |
| 2006/0001392 | A1 | 1/2006 | Ajima et al. |
| 2006/0290315 | A1* | 12/2006 | Hosoi .................... D05B 19/12 |
| | | | 318/685 |
| 2006/0290316 | A1 | 12/2006 | Seguchi et al. |
| 2009/0296777 | A1 | 12/2009 | Fish |
| 2010/0026128 | A1* | 2/2010 | Ionel ..................... H02K 1/276 |
| | | | 310/156.53 |
| 2010/0259136 | A1 | 10/2010 | Hiramoto et al. |
| 2011/0291599 | A1 | 12/2011 | El-Antably et al. |
| 2012/0242272 | A1 | 9/2012 | Yamada et al. |
| 2012/0268081 | A1 | 10/2012 | Tripathi et al. |
| 2013/0314021 | A1 | 11/2013 | Yamada et al. |
| 2013/0334937 | A1 | 12/2013 | Yamada et al. |
| 2014/0028160 | A1 | 1/2014 | Yamada et al. |
| 2015/0035520 | A1 | 2/2015 | Roesner et al. |
| 2015/0091481 | A1 | 4/2015 | Tago et al. |
| 2015/0171781 | A1 | 6/2015 | Halkosaari et al. |
| 2018/0048213 | A1* | 2/2018 | Rubin ...................... H02K 1/06 |
| 2019/0158004 | A1 | 5/2019 | Pramod et al. |
| 2019/0207491 | A1 | 7/2019 | Seguchi |
| 2019/0280540 | A1* | 9/2019 | Lindner ................. H02K 16/00 |
| 2020/0052557 | A1* | 2/2020 | Rubin .................... H02K 1/246 |
| 2020/0235683 | A1 | 7/2020 | Suzuki et al. |
| 2023/0048207 | A1 | 2/2023 | Mori et al. |

| | | | |
|---|---|---|---|
| 2023/0145709 | A1 | 5/2023 | Pennington, III et al. |
| 2023/0148310 | A1 | 5/2023 | Pennington, III et al. |
| 2023/0231444 | A1 | 7/2023 | Pennington, III et al. |
| 2024/0014721 | A1 | 1/2024 | Pennington, III et al. |
| 2024/0213864 | A1 | 6/2024 | Pennington, III et al. |
| 2025/0125697 | A1 | 4/2025 | Pennington, III et al. |

FOREIGN PATENT DOCUMENTS

| | | | |
|---|---|---|---|
| JP | 2005-237054 | A | 9/2005 |
| JP | 2007-185082 | | 7/2007 |
| JP | 2007-185082 | A | 7/2007 |
| JP | 2006-515500 | A | 5/2008 |
| JP | 2008-178166 | | 7/2008 |
| JP | 2009-112091 | | 5/2009 |
| JP | 2009-290930 | | 12/2009 |
| JP | 2012-170252 | | 9/2012 |
| JP | 2012-170252 | A | 9/2012 |
| JP | 2013-085439 | A | 5/2013 |
| JP | 2014045555 | A | 3/2014 |
| JP | 2014-171326 | A | 9/2014 |
| KR | 10-2018- 0082300 | | 7/2018 |

OTHER PUBLICATIONS

Office Action in Chinese Appln. No. 202180063075.2, dated Oct. 21, 2024, 9 pages (with English translation).
Office Action in Korean Appln. No. 10-2024-7004573, mailed on Oct. 11, 2024, 9 pages (with English translation).
Office Action in Chinese Appln. No. 202180063075.2, dated Jan. 18, 2024, 18 pages (with English translation).
Extended European Search Report in European Appln No. 21849219.7, mailed on Jan. 2, 2024, 10 pages.
Extended European Search Report in European Appln No. 21849413.6, mailed on Dec. 12, 2023, 10 pages.
International Search Report and Written Opinion in International Appln. No. PCT/US2021/044207, dated Dec. 7, 2021, 12 pages.
International Search Report and Written Opinion in International Appln. No. PCT/US2021/044213, dated Oct. 28, 2021, 8 pages.
Office Action in Australian Appln. No. 2021318184, dated Aug. 23, 2023, 4 pages.
Office Action in Australian Appln. No. 2021319214, dated Aug. 16, 2023, 3 pages.
Office Action in Canadian Appln. No. 3,190,431, dated Jul. 28, 2023, 3 pages.
Office Action in Chinese Appln. No. 202180063065.9, dated Sep. 29, 2023, 16 pages (with English translation).
Office Action in Japanese Appln. No. 2023-506210, dated Aug. 2, 2023, 15 pages (with English translation).
Office Action in Korean Appln. No. 10-2023-7006572, dated Aug. 11, 2023, 11 pages (with English translation).
Office Action in Australian Appln. No. 2024200951, dated Aug. 26, 2025, 2 pages.
Office Action in Japanese Appln. No. 2025-067844, mailed on Jun. 6, 2025, 7 pages (with English translation).
Office Action in Japanese Appln. No. 2024-14930, mailed on Aug. 8, 2025, 45 pages (with English machine translation).
Office Action in Chinese Appln. No. 202180063065.9, dated Jun. 18, 2024, 12 pages (with English translation).
Office Action in Chinese Appln. No. 202180063065.9, dated Sep. 4, 2024, 11 pages (with English translation).
Office Action in Japanese Appln. No. 2023-506213, dated Jul. 26, 2024, 7 pages (with English translation).
Office Action in Korean Appln. No. 10-2023-7006614, dated Jul. 26, 2024, 16 pages (with English translation).
Office Action in Australian Appln. No. 2023251443, dated Nov. 16, 2024, 5 pages.
Office Action in Japanese Appln. No. 2024014939, dated Nov. 14, 2025, 7 pages (with English machine Translation).

\* cited by examiner

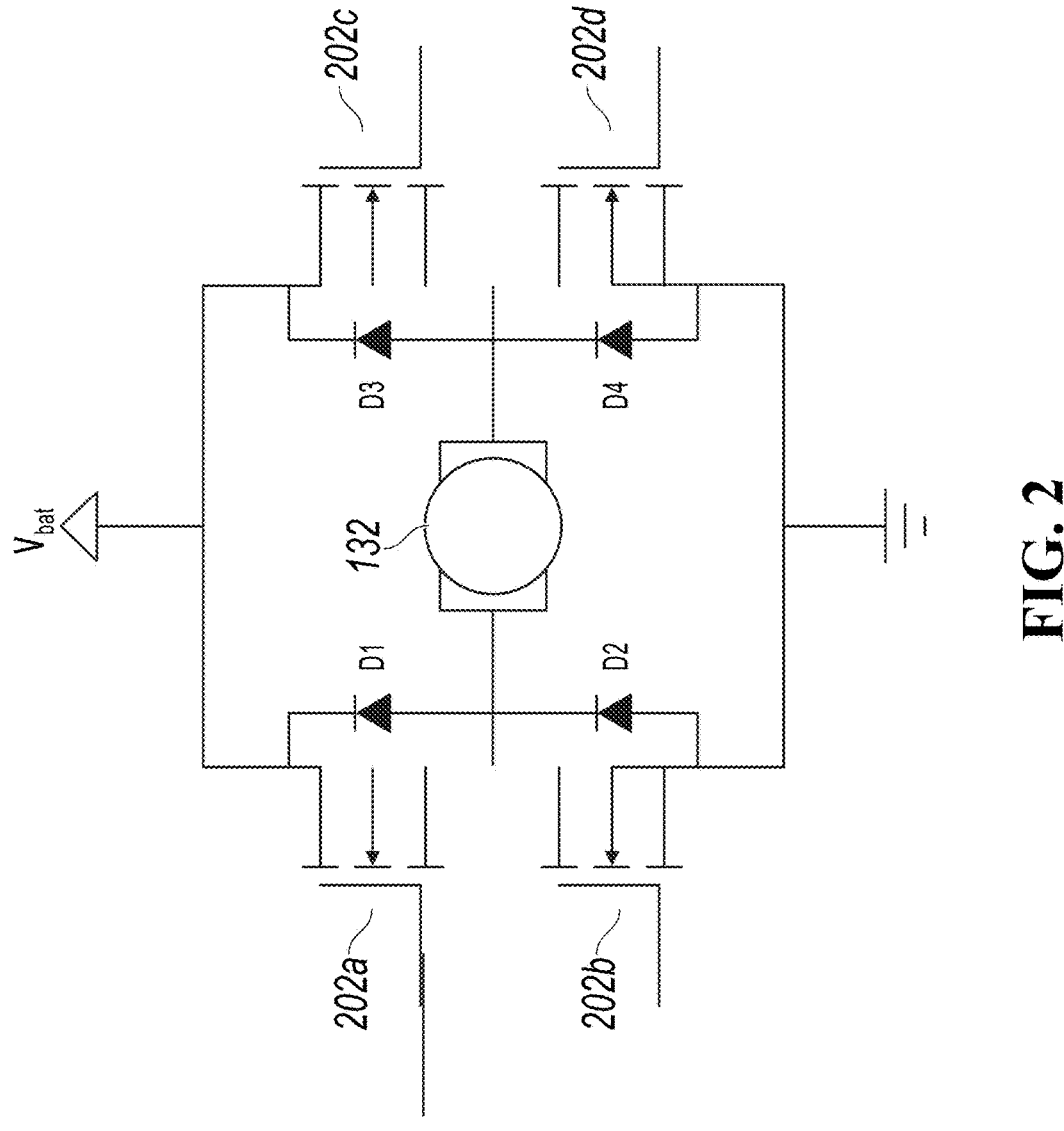
FIG. 2

300
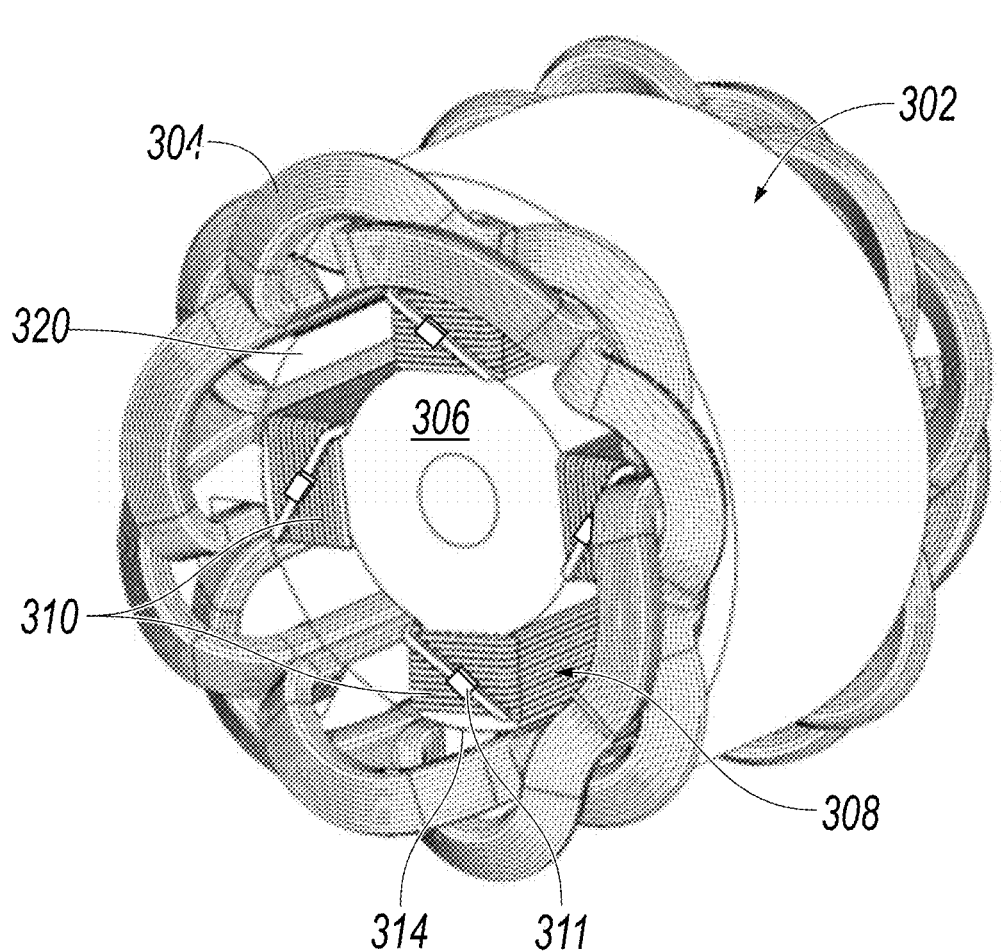
FIG. 3A

*300*
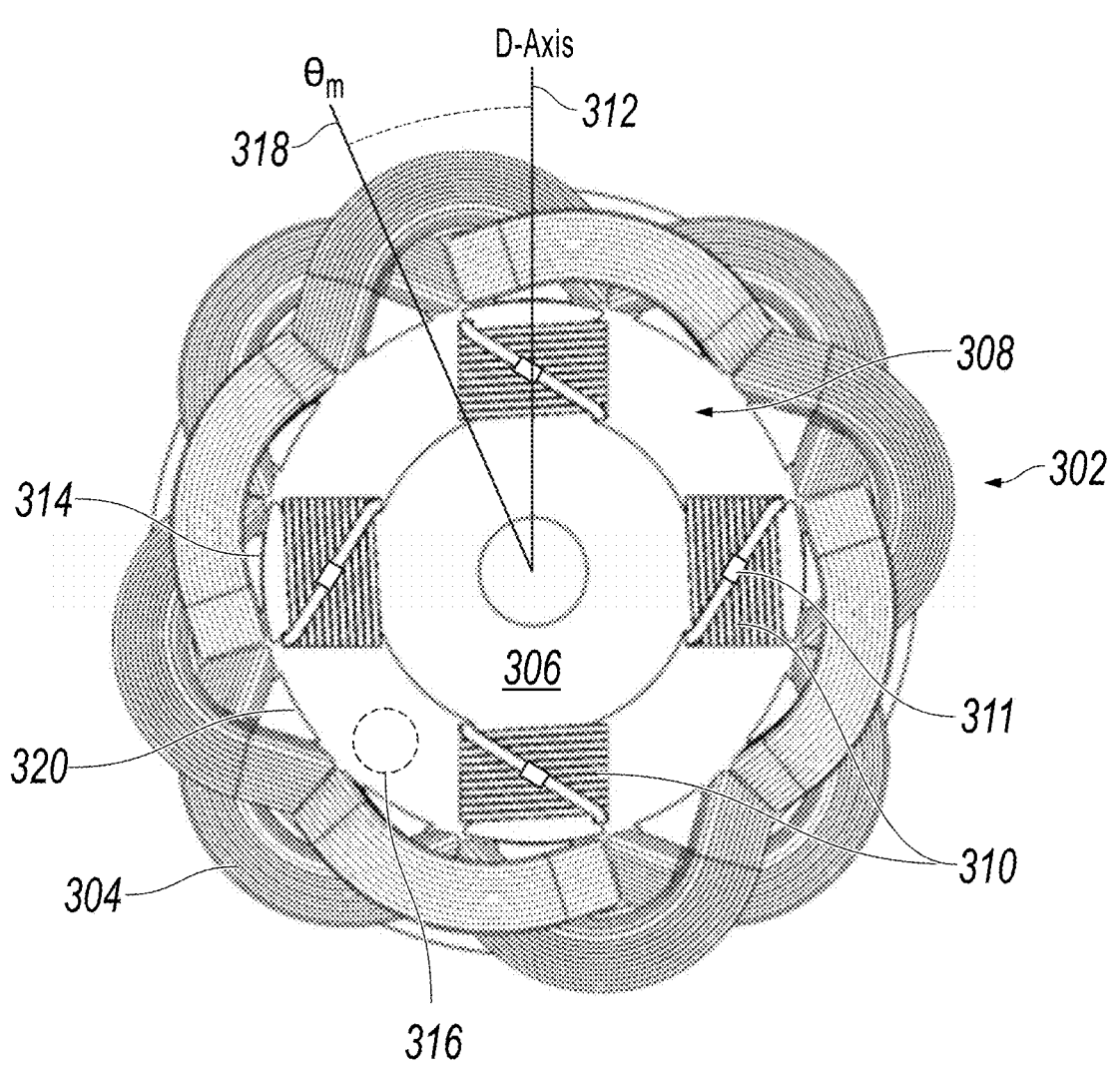
FIG. 3B

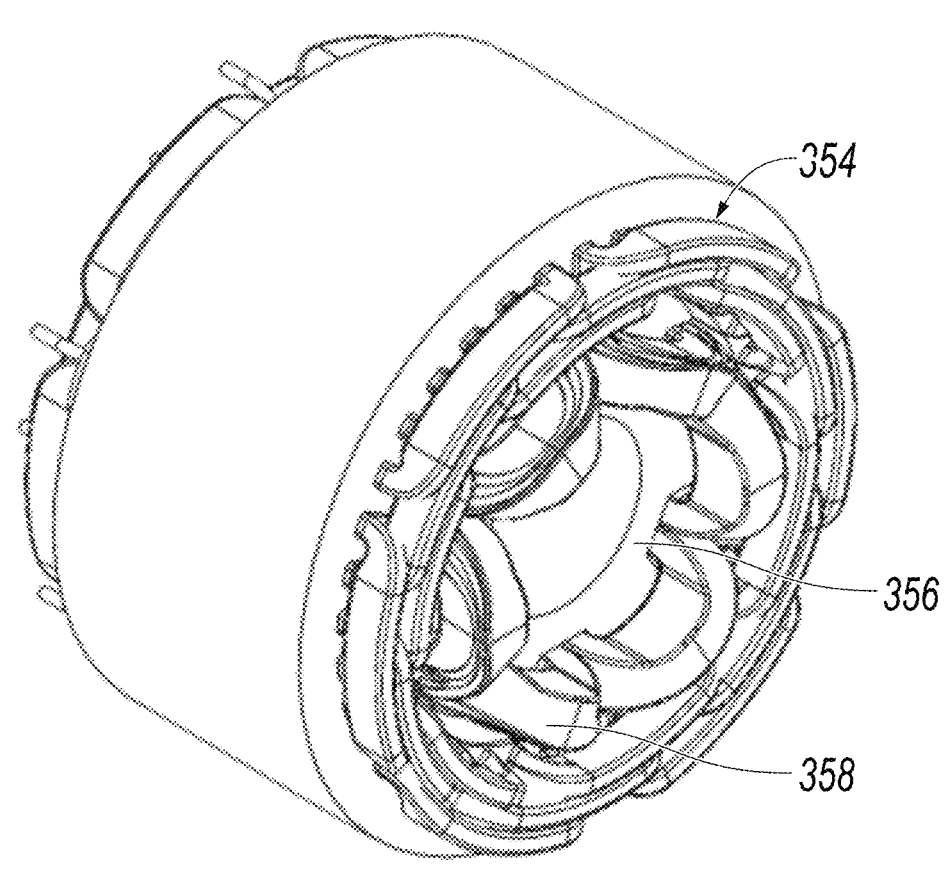
FIG. 3C

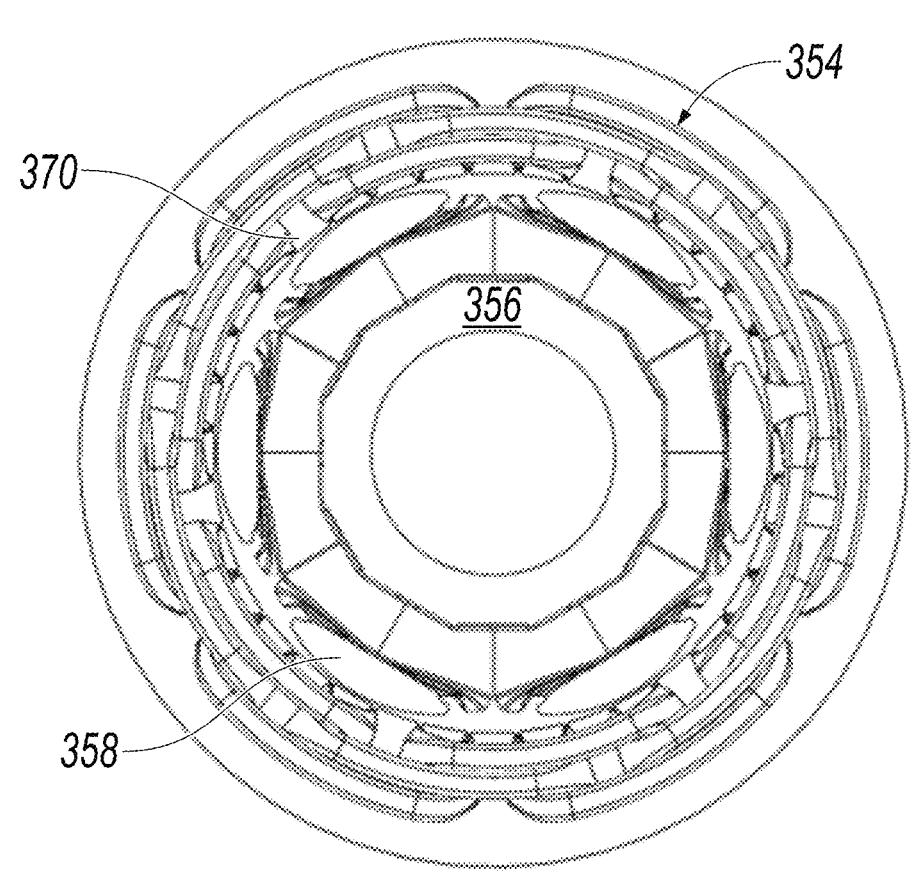
FIG. 3D

700
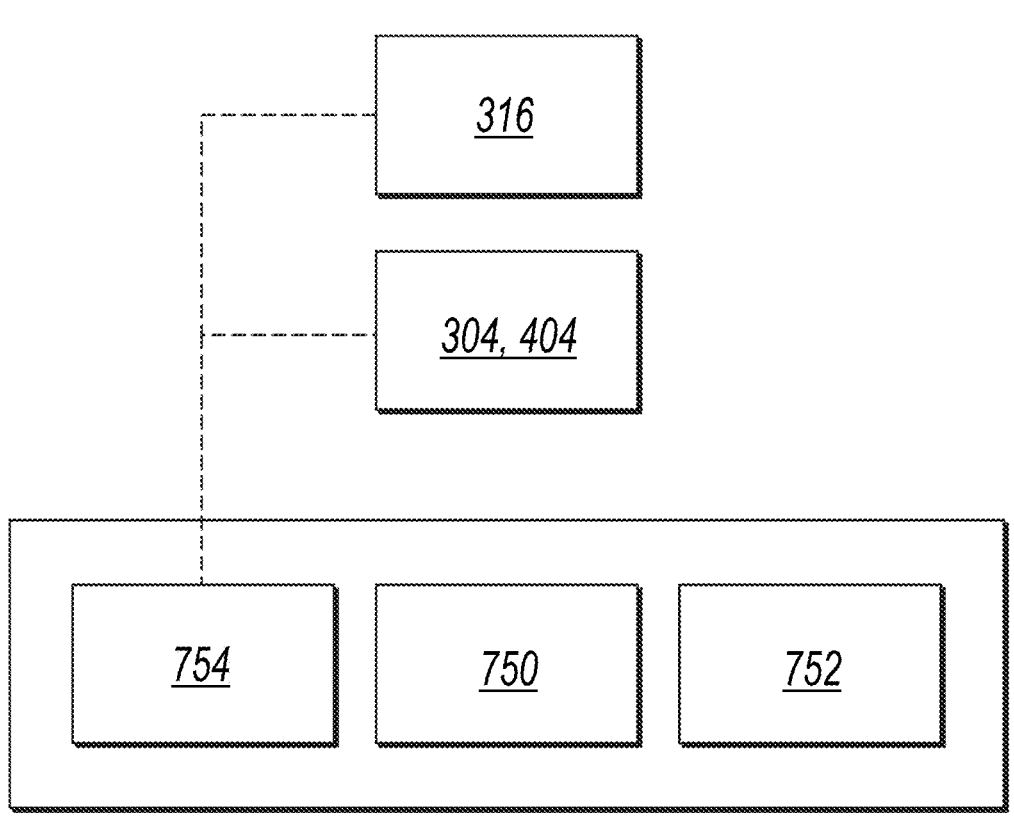
FIG. 7

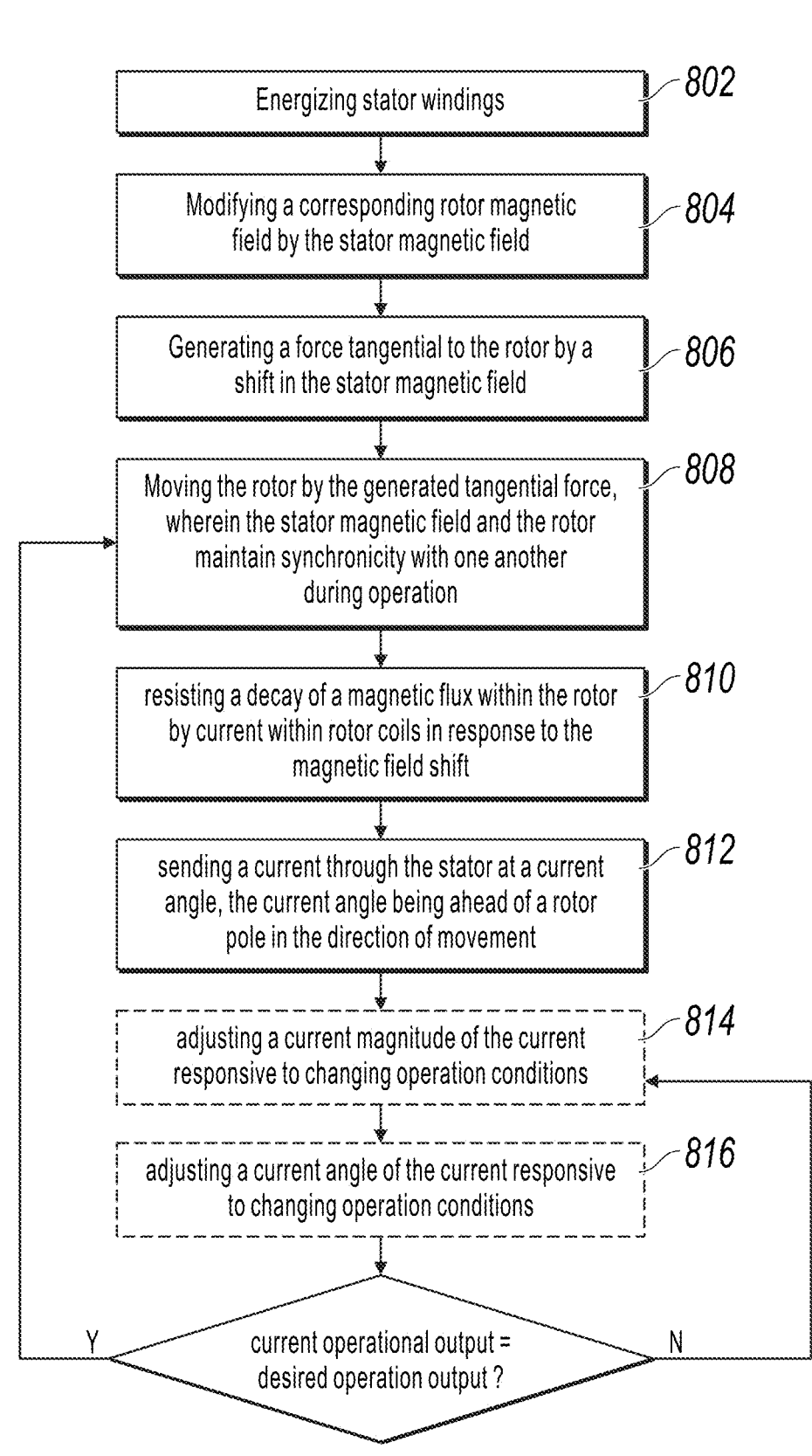

*800*

802 Energizing stator windings

804 Modifying a corresponding rotor magnetic field by the stator magnetic field

806 Generating a force tangential to the rotor by a shift in the stator magnetic field

808 Moving the rotor by the generated tangential force, wherein the stator magnetic field and the rotor maintain synchronicity with one another during operation

810 resisting a decay of a magnetic flux within the rotor by current within rotor coils in response to the magnetic field shift

812 sending a current through the stator at a current angle, the current angle being ahead of a rotor pole in the direction of movement

814 adjusting a current magnitude of the current responsive to changing operation conditions

816 adjusting a current angle of the current responsive to changing operation conditions Y    current operational output = desired operation output ?    N

FIG. 8

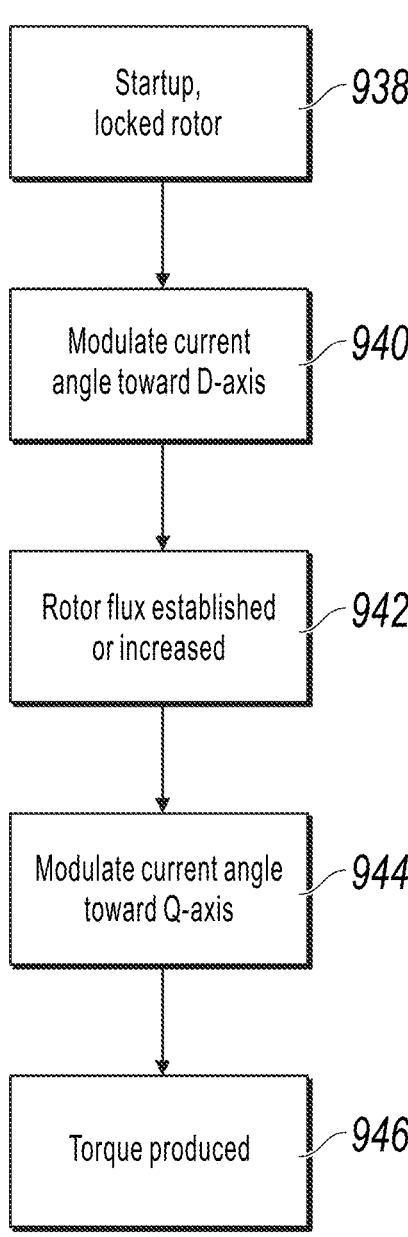
FIG. 9C

*948*

*950* High speed operation

*952* Reduced duty cycle of current angle modulation

*954* Reduced amplitude of current modulation (Id)

*956* Decrease rotor flux

*958* Lower back emf

*960* Decrease cogging torque

*962* Torque increased

POWER DISTRIBUTION WITHIN AN ELECTRIC MACHINE WITH RECTIFIED ROTOR WINDINGS

CLAIM OF PRIORITY

This application is a continuation of U.S. application Ser. No. 18/179,743, filed Mar. 7, 2023, which is a continuation of U.S. application Ser. No. 17/634,715, filed Feb. 11, 2022, now U.S. Pat. No. 11,637,481, which is a U.S. National Phase application under 35 U.S.C. § 371 of International Patent Application No. PCT/US2021/044213, filed on Aug. 2, 2021, which claims priority under 35 USC § 119 (e) to U.S. Patent Application Ser. No. 63/059,930, filed on Jul. 31, 2020, the entire contents of which are hereby incorporated by reference.

TECHNICAL FIELD

This invention relates to electric motors and generators.

BACKGROUND

Electric motors generally comprise a stationary component, often referred to as a stator, and a rotational component often referred to as a rotor. Electric current is translated into electromagnetic fields which exert a mechanical force, or torque, between the stator and the rotor, which may be used to do work. Generators work on similar principles with mechanical force being translated into electric current. While primarily described in terms of rotational force, or torque, the principles described herein are also applicable to linear motors. For linear motors, in some implementations, the rotor acts as the stationary component while the stator acts as a translated component.

SUMMARY

This disclosure describes technologies relating to wirelessly transferring power within an electric machine.

An example implementation of the subject matter described within this disclosure is an electric machine with the following features. A stator defines multiple stator poles with associated stator windings. A rotor defines multiple fixed rotor poles with associated rotor windings that include a rectifier and are configured to be energized only by the stator. The rotor defines a rotor field energizable by magnetic fields produced by the stator windings to produce relative motion between the rotor and the stator. A controller is configured to send a current through the stator windings at a current angle measured relative to a closest one of the rotor poles. The controller is configured to adjust the current angle in response to operating conditions. The controller is configured to adjust a current magnitude of the sent current in response to operating conditions. The rotor is maintained in synchronicity with the magnetic fields produced by the stator windings during operation.

In some implementations, the stator windings include concentrated windings.

In some implementations, the stator windings include distributed windings.

In some implementations, the stator windings include salient windings.

In some implementations, the rotor windings include concentrated windings.

In some implementations, the rotor windings include salient windings.

In some implementations, the rotor windings include non-overlapping windings.

In some implementations, the rectifier includes a diode.

In some implementations, a direction of rectification alternates between rotor poles.

In some implementations, the rotor includes permanent magnets.

In some implementations, the permanent magnets are substantially aligned with the rotor poles.

An example implementation of the subject matter described in this disclosure is a method of controlling an electric machine. The method includes the following features. Stator windings of a stator are energized to produce a stator magnetic field within the stator. a corresponding rotor magnetic field, within ferromagnetic material within a rotor pole, is modified by the stator magnetic field by establishing a magnetic flux. A force tangential to the rotor is generated by a shift in the stator magnetic field. The rotor is moved by the generated tangential force. A delay of energization of flux in an air gap is reduced by a rectifier. The air gap is defined between an inner surface of the stator and an outer surface of the rotor. A decay of a magnetic flux within the rotor is resisted by current within rotor windings in response to the magnetic field shift. The stator magnetic field and the rotor maintain synchronicity with one another during operation. A current is sent through the stator windings at a current angle measured relative to a nearest one of the rotor poles. A current magnitude of the sent current is adjusted in response to operating conditions. The current angle is adjusted in response to operating conditions.

In some implementations, maintaining the flux includes resisting a first change of flux by inducing a first current in a first direction within the rotor windings until the first current decreases to zero, and maintaining the flux includes allowing a second change in flux to induce a current in a second direction within the rotor windings.

In some implementations, a reverse tangential force is reduced by the rectifier.

In some implementations, the rectifier includes a diode.

An example implementation of the subject matter described in this disclosure is a wound field rotor synchronous machine with the following features. A stator defines multiple stator poles with associated stator windings. A rotor defines multiple rotor poles. The rotor is configured to rotate synchronously with the stator. The rotor includes rotor windings associated with each of the rotor poles. The rotor windings are configured to be energized by a magnetic field produced by the stator windings to produce a rotor field. The rotor windings include a rectifier. Permanent magnets are embedded within the rotor. A controller is configured to energize the stator windings. The controller is configured to produce the stator magnetic field within the stator by sending a control signal to the stator windings by sending a current through the stator windings at a current angle measured relative to a closest the rotor poles. The controller is configured to adjust the current angle in response to operating conditions. The controller is configured to adjust a current magnitude of the sent current in response to operating conditions.

In some implementations, the permanent magnets are miss-aligned from the rotor poles.

In some implementations, the rectifier comprises a Schottky diode.

In some implementations, the rectifier is configured to reduce torque ripple during operation.

In some implementations, a position sensor is configured to detect a position of the rotor relative to the stator. In such instances, the controller is further configured to receive a position stream from the position sensor. The position stream is representative of the rotor position. The controller is further configured to, responsive to receiving the position stream, determine a torque ripple is present. The controller is further configured to adjust a current angle relative to the rotor pole responsive to determining a torque ripple is present. The controller is further configured to adjust a current magnitude of the current responsive to determining a torque ripple is present.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a schematic illustration of an example power switch for an electrical winding.

FIGS. 3A-3B are perspective and side views of an example electric machine.

FIGS. 3C-3D are perspective and side views of an example electric machine.

FIG. 7 is a block diagram of an example controller that can be used with aspects of this disclosure.

FIG. 8 is a flowchart of a method that can be used with aspects of this disclosure.-

FIG. 9C is a flowchart of a method for starting a motor in accordance with an aspect of this disclosure.

Like reference numbers and designations in the various drawings indicate like elements.

DETAILED DESCRIPTION

This disclosure relates to a field wound synchronous motor with an electromagnetically directly coupled rotor and stator. The rotor coils can include a rectifier, such as a diode. The addition of the rectifier helps reduce torque ripple in the motor during operations. The rotor poles of the rotor are both topologically and electrically fixed upon a rotor surface. The rotor is substantially energetically isolated from stator components except for the stator windings. That is, the rotor field is configured to be energized by a magnetic field produced by the stator windings. A stator magnetic field and the rotor maintain synchronicity with one another during operation. During operation, a controller is configured to send a current through the stator and actively adjust the current magnitude and angle in response to present or changing operating conditions. Such a motor is able to operate with the efficiency of a synchronous machine without the need for expensive rare-earth magnets, and without the need of a separate brush or exciter circuitry to energize windings within the rotor.

The electric machines described herein feature shorted, concentrated windings defining the rotor poles. While shorted damper bars have been proposed within rotors for transient dampening, they tend to have a limited frequency response. In contrast, shorted, concentrated windings can provided effective transient damping during operation across a wide range of frequencies. In addition, the various electric machines described within this disclosure can take advantage of inherent non-linearity and asymmetry that occurs during saturation of a rotor back-iron. That is, inductance within the coils becomes asymmetric, and produces a net torque as a result. The addition of a rectifier with the coils furthers this asymmetry, and reduces torque ripple.

Thus, the present disclosure provides subject matter for controlling motors electric machines or motors to achieve a variety of different goals. For example, the present disclosure provides subject matter for achieving desired operational goals without the need for or with reduced reliance upon rare-earth elements or wear elements, such as brushes or exciter circuits, or for improving other operational aspects of the system, such as producing a net torque designed to control undesired torque ripples.

Figure 1:
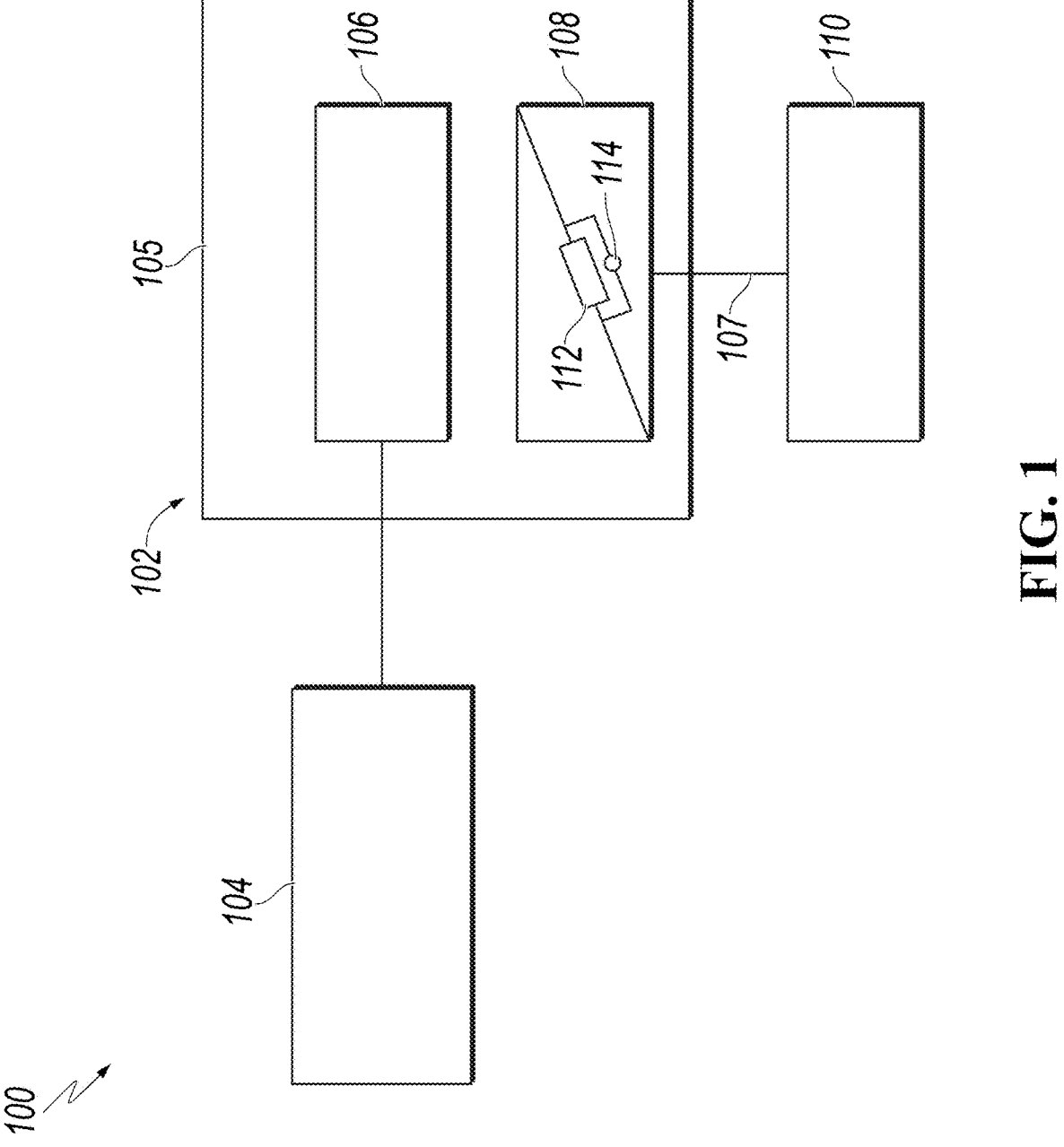
FIG. 1 is a schematic illustration of an example of an electric drive system.

FIG. 1 illustrates an electric drive system 100 that includes an electric motor 102 and a motor controller 104 coupled to the electric motor 102. The motor controller 104 is configured to operate the electric motor 102 to drive a load 110. The load 110 can be an additional gear train such as a gear set, a vehicle wheel, a pump, a compressor, or another motor where multiple motors can be linked and operated in parallel.

The electric motor 102 has an output shaft 107 rotatable with respect to a motor housing 105, which is considered to be a datum with respect to rotations and other motions of motor components. In use, the output shaft 107 can be coupled to the load 110 to which the electric motor 102 can impart rotary power when electrically activated by appropriate electrical power and signals from the motor controller 104. The output shaft 107 may extend through the motor and be exposed at both ends, meaning that rotary power can be transmitted at both ends of the motor. Motor housing 105 can be rotationally symmetric about the rotation axis of output shaft 107, but may be of any external shape and can generally include means for securing the motor housing 105 to other structures to prevent housing rotation during motor operation.

The electric motor 102 includes an active magnetic component 106 such as a stator and a passive magnetic component 108 such as a rotor. For illustration purposes, in the following, stator is used as a representative example of the active magnetic component and rotor is used as a representative example of the passive magnetic component.

The rotor 108 is associated with the stator 106 and can be disposed within the stator 106, e.g., in an internal rotor radial-gap motor, or parallel to the stator, e.g., in an axial-gap motor or in a linear motor. As described more fully below, electrical activity in the stator 106, properly controlled, drives motion of the rotor 108. The rotor 108 is rotationally coupled to the output shaft 107, such that any rotational component of resultant rotor motion is transmitted to the output shaft 107, causing the output shaft 107 to rotate. The stator 106 is fixed to the electric motor 102 such that during operation the rotor 108 moves about the stator 106 or parallel to the stator 106.

As described throughout this disclosure, a rectification system 112 may be included and can be implemented in a variety of different ways. For example, the rectification system may be configured to operate as passive or active. In some implementations, passive rectification may use one or more diodes. In some implementations, in the cases of an active system, active rectification may include transistors, such as, one or more MOSFETs. In some implementations, the rectification system 112 may be configured as a half-wave rectifier when using passive components, such as one or more diodes. In some implementations, the rectification system 112 may be configured as a full wave rectifier, for example, when using active rectification.

Whether active or passive, the inclusion of the rectification system 112 can further mitigate torque ripple by controlling an AC component in the rotor coil or winding (specifically, the negative current component) that may be present under energization conditions. The AC component often occurs during the charge phase (low current angle) resulting in a decrease of sheet current density. Rectification substantially removes this component and creates a system wherein the coil only flows current at higher current phasor angles. In some implementations, a higher current phasor angle is greater than 45 degrees, 65 degrees, or 75 degrees.

The asymmetric electrical resistance of the rectification system enables a quicker decay of current (when compared to non-rectified systems) in the rotor topology. For example, in a fractional slot stator that may have salient poles, a faster decay may be desirable to benefit charge, or fluxing, cycles and limit torque ripple. In machines with a rectified rotor that has a unidirectional passive circuit with, for example, a single diode, the current in the winding must be nulled-out in order to inject volt-seconds into the rotor. Oscillating to a low current angle (for example, less than 45 degrees, less than 35 degrees, or less than 15 degrees) can quickly decay the rotor current in order to further flux the system, or to effectively field weaken the rotor for certain operation conditions (e.g., high speed or low torque operation).

The present disclosure also describes a linear electrical load 114 in parallel with a rectification system, such as an electrical resistor, or a non-linear electrical load, such as an avalanche diode or voltage arrester gas discharge tube, to accelerate the rotor current decay prior to charging and limit damage caused by overvoltage discharge. In some implementations, the one or more linear loads 114 includes electrical resistors with a resistance of greater than 100 ohms, 150 ohms, 300 ohms, or 1,000 ohms. In some implementations, a gas discharge tube or avalanche diode has a reverse breakdown voltage of greater than 50 volts, 100 volts, 200 volts, 400 volts, 600 volts, or 800 volts, and a response time of less than 10 ms, 5 ms, 2 ms, 0.5 ms, or 0.1 ms.

Current flowing through a loop of electric wire will result in a substantially uniform magnetomotive force (MMF) resulting in a motor pole within the wound, or encircled, region. In a typical motor, such a loop has a sufficient diameter to carry the desired current load, but is thin enough that a skin depth of the drive frequency fully penetrates the loop. Many turns, or overlapping loops of wire, may be used to increase the pole magnetic field strength. This topology is typically referred to as a wound field pole. Such a set of overlapping loops is referred to as a coil. For the purposes of this disclosure, multiple coils acting together within the stator or rotor are referred to as a winding. In some instances, coils can overlap and encompass multiple teeth on either a rotor or a stator. Such overlapping coils can be referred to as an armature or a distributed winding. A pole is a magnetic center of this distributed winding, and as such, the pole can move relative to the individual coils within such a distributed winding depending upon the drive current passing through the winding.

The stator 106 defines multiple stator poles with associated electrical windings and the rotor 108 includes multiple rotor poles, such as the examples illustrated with further details throughout this disclosure. The rotor 108 defines, together with the stator 106, a nominal air gap between the stator poles and the rotor poles, such as the example as illustrated with further details throughout this disclosure. The rotor 108 is movable with respect to the stator 106 along a motion direction.

FIG. 2 shows another example power switch 200 for an individual electrical winding 132. The power switch 200 can have an H-bridge circuit including four switching elements 202a, 202b, 202c, 202d, with the electrical winding 132 at the center, in an H-like configuration. The switching elements 202a, 202b, 202c, 202d can be bi-polar or FET transistors. Each switching element 202a, 202b, 202c, 202d can be coupled with a respective diode D1, D2, D3, D4. The diodes are called catch diodes and can be of a Schottky type. The top-end of the bridge is connected to a power supply, e.g., a battery Vbat, and the bottom-end is grounded. Gates of the switching elements 202a, 202b, 202c,202d can be coupled to the winding controller 130 which is operable to send a respective control voltage signal to each switching element 202a, 202b, 202c, 202d. The control voltage signal can be a DC voltage signal or an AC (alternating current) voltage signal.

The switching elements 202a, 202b, 202c, 202d can be individually controlled by the motor controller 104 and can be turned on and off independently. In some cases, if the switching elements 202a and 202d are turned on, the left lead of the stator is connected to the power supply, while the right lead is connected to ground. Current starts flowing through the stator, energizing the electrical winding 132 in a forward direction. In some cases, if the switching elements 202b and 202c are turned on, the right lead of the stator is connected to the power supply, while the left lead is connected to ground. Current starts flowing through the stator, energizing the electrical winding 132 in a reverse, backward direction. That is, by controlling the switching elements, the electrical winding 132 can get energized/activated in either of two directions. While primarily illustrated and described as using a single phase H-bridge configuration, a typical six switch inverter system can be used for multiphase machines without departing from this disclosure.

The motor controller 104, can be configured to sequentially operate the switches 134 or 200 for respective pole energization duty cycles to generate magnetic flux across the air gap between the stator poles and rotor poles, as described with further details throughout this disclosure. The switches can be controlled to sequentially energize stator poles to create a local attraction force pulling on the rotor. Such a sequential energization (or activation) can cause a rotation of the rotor 108, the output shaft 107, and the load 110.

Motor components and controls are sometimes discussed in reference to a D-axis 312 (example illustrated in FIG. 3)

and Q-axis of a motor rotor and/or stator. The direct axis, or D-axis 312, in a motor may be defined as the center line of a pole 308 perpendicular to the air gap 314, and may be applied to either a stator pole 411 (See FIG. 4) or rotor pole 408. A rotor may be characterized with a D-axis 312 for each pole as viewed in the synchronous reference frame. In a wire wound rotor, the D-axis 312 is the center point of the resultant magnetic center of a coil or field winding regardless of whether the field winding is concentrated to a single, large slot or spread across multiple, smaller slots. Stator poles can be similarly characterized.

The Q-axis is normal (that is, electrically) 90° to the D-axis within the magnetic reference frame. In general, forces along the Q-axis generate an electromotive force, such as torque. Topologically, the Q-axis of a rotor or a stator is typically located directly between two poles.

In such a system where control signals can be transformed into D-Q-axis components, a third z-axis component is also present and can be described as the signal or magnetic quantities that do not map directly onto the D- or Q-axis. For example, a component orthogonal to the plane in which the Q and D components can be found.

The current phasor angle 318 is the relative angle of a rotor pole D-axis 312 to the magnetic center of the stator (example illustrated in FIGS. 3A and 3B). A positive current phasor angle indicates that the magnetic center of the stator is ahead of the rotor pole in a direction of motion. Such a situation results in the magnetic center of the stator "pulling" the rotor pole towards the magnetic center of the stator. Similarly a negative current angle indicates that the magnetic center of the stator is behind the rotor pole. Such a situation "pulls" the rotor pole in the opposite direction. Such a negative current phasor angle 318 can be used in braking situations. In some implementations, a current phasor angle 318 of greater than 90° can be used. Such a large phasor current angle 318 can "push" an adjacent pole in the direction of motion. Similarly, a current phasor angle 318 of less than −90° can be used to "push" an adjacent pole in an opposite direction, such as during braking operations. Converting the current phasor angle 318 between the stationary and synchronous reference frames can be done using the following equation:

$$\theta_e = (P/2)\theta_m \qquad (1)$$

Where $\theta_e$ is the current phasor angle in the synchronous reference frame, P is the number of stator poles, and $\theta_m$ is a current phasor angle in the stationary reference frame. Regardless of the current phasor angle, it can be broken down into a D-axis component and a Q-axis component. In general, for the motors and generators described herein, the D-axis component acts to "charge" or modulate the field within a rotor pole while the Q-axis component acts to impart a force or torque onto the rotor pole. Throughout this disclosure, adjusting both the current phasor angle 318 and the current phasor amplitude, based on operating conditions, is described in detail.

Current angle, duty cycle, and D-axis to Q-axis current injection, for example, can be all be varied. In some instances, a momentary D-axis current increase may be achieved relative to the Q-axis current by at least 5%, 10%, 20%, or 30% during the D-axis injection period. In some instances, a decrease of resultant current angle may be achieved by, for example, 5-60 degrees, 10-50 degrees, 15-45 degrees, or 22.5-67.5 degrees during the injection cycle. In some instances, an injection pulse width of between 2-70 ms, 5-50 ms, or 10-25 ms may be used. In some instances, a charging duty cycle of 5%, 10% 15%, or 25% of total time of operation may be used. In some instances, the current angle transition period from D-axis injection to normal operation is 500 us to 15 ms, 2 ms-12 ms, or 4 ms-10 ms, as determined by rotor current decrease to zero. In some instances, the current angle is changed by less than 15 degrees, 10 degrees, or 5 degrees. In some instances, the D-axis and Q-axis magnitude vary concurrently by at least 5%, 10%, 20%, or 30% during the D-axis injection period. The system may be operated as current controlled or voltage controlled. For example, irrespective of the particular operational parameters, the signal may be injected via a current source inverter with a current injection ripple magnitude variance that is controlled to be within a desired tolerance.

As described throughout this disclosure, the coil structures on the rotor receive the power/signals from the stator through an inductive coupling, including at least one loop about a rotor pole. In some implementations, the rotor coil for conductive loop form a capacitance, where, in some implementations, the capacitance is formed, inserted, or defined by a certain part of the rotor coil or conductive loop. In some implementations, the rotor coil or conductive loop includes a resonant frequency. In some implementations, the resonant frequency of the rotor coil is in the transmissible range of the magnetically permeable pole or rotor coil material.

In operation, a rotor pole can be fluxed via a D-axis signal on the stator while the coil structure resists the change in flux on the pole and flows current. A Q-axis signal on the rotor produces torque on the fluxed machine. In some topologies, for example in a salient pole wound synchronous machine, maximum torque per ampere (MTPA) occurs at a current angle of between 60-90 degrees. For a given operating condition (e.g., torque and speed) the controller establishes the MTPA (e.g., through a lookup table or model-based estimator) which includes a combination of D-axis and Q-axis currents (principal control components) that establish a current phasor angle. This current phasor angle may be modulated or oscillated about to periodically maintain the desired level of rotor flux, which may be monitored by an observer or estimator, or established through a model-based approach. As the D-axis is modulated to increase the rotor flux, the magnitude of the Q-axis current may be proportionally modulated to limit torque ripple and reduce any adverse effects of changing the current phasor angle, or to limit the change in the current phasor angle.

FIGS. 3A-3B are perspective and side views of an example electric machine 300. The electric machine 300 includes a stator 302 defining multiple stator poles with associated stator windings 304. A "motor pole" may be described as topological section on either a stator or rotor that emits a single polarity of magnetic flux across the air gap at a given point in time. Flux carried in the back-iron of the stator or rotor is considered when determining the pole number or location in an electric motor. Poles are typically characterized by high field regions, which may exceed 5,000 gauss. Poles may result from permanent magnets or from electromagnetic fields. While the number of poles on a stator or rotor are often fixed during manufacturing, in some implementations described herein, the number of poles for the rotor, stator, or both, can be changed during operation.

While the presently illustrated stator 302 is presently illustrated as having distributed windings 304, a salient, concentrated, and/or non-overlapping stator can similarly be used without departing from this disclosure. A rotor 306 defines multiple rotor poles 308 with associated rotor coils 310. While the illustrated implementation includes ⅓ of the rotor teeth in comparison to stator teeth, other ratios can be used without departing from this disclosure, for example, the rotor can include ½ of the teeth as are present in the stator. In some implementations, the rotor can include ¼ the teeth as are present in the stator. Other ratios of rotor teeth to stator teeth can be used without departing from this disclosure regardless if salient, concentrated stator winding are used or if distributed stator windings are used.

As illustrated, each of the rotor coils 310 is shorted to a rectifier 311. While illustrated as having a rectifier for each coil 310, other arrangements can be used without departing from this disclosure. For example, multiple rotor coils can be electrically coupled to a single rectifier in series or in parallel. In some implementations, the rectifier 311 can include a diode. Several types of diodes can be used, for example, a p-n junction diode, a gas diode, a Zener, or a Schottky diode. In some implementations, when a Schottky diode is used, the Schottky diode can be a silicon carbide diode. Diode selection is a function of a variety of factors, including voltage drop, reverse voltage breakdown, and recovery time. Different diodes may be used depending on the desired operating conditions. While several types of diodes have been listed, other diodes can be used without departing from this disclosure. The rectifier only allows current to travel in a single direction through each of the rotor coils 310.

The rotor poles 308 are topologically and electrically fixed upon a rotor surface. A fixed-pole rotor is a rotor in which the poles are topographically and electromagnetically fixed or held static relative to synchronous reference frame, for example, rotor 306 is a fixed-pole rotor. That is, the rotor 306 will always rotate at substantially the same speed as, or in sync with, the drive frequency provided by the stator (allowing for inherent levels of torque ripple). The synchronous reference frame is the same as the magnetic reference frame. Fixed-pole motors are often referred to as "synchronous" motors for this reason. Field wound rotors, surface PM rotors, reluctance motors, and interior PM rotors are all examples of fixed pole rotors. Fixed pole rotor designs maximize the utilization of ferromagnetic material in the rotor D-axis 312 region (center of a rotor pole), and in the case of wound field rotors, ensuring that the effective magnetic center aligns with the D-axis 312. As a result, fixed pole rotors are considered to be more efficient than shifting pole rotors for a given size and power rating; however, fixed pole rotors are difficult to control in that maintaining a fixed pole rotor at a constant current phasor angle under dynamic load conditions and dynamic running speeds is challenging. For example, accelerating the motor or maintaining speed during a change in load involves actively adjusting the current phasor angle 318, the current magnitude, and/or drive frequency based on input from a position sensor 316. The concepts described herein are primarily applicable to synchronous machines as the stator magnetic field and the rotor, for example, the rotor 306, maintain synchronicity with one another during operation.

In contrast, the poles of shifting pole rotors are not topographically or electromagnetically fixed and will move under operation relative to the stationary reference frame. That is, the rotor will always "slip" and lag behind, or be out of synch with, the drive frequency provided by the stator. As such, these motors are often referred to as "asynchronous" motors. Examples of shifting pole rotors include wire wound and squirrel cage induction rotors, armature wire wound rotors, brush motors, and other similar motors. While shifting pole rotors are able to self-regulate current phasor angle 318 during operation, design concessions between D-axis ferromagnetic material and Q-axis field windings must be made to enable the pole to move evenly across the rotor surface. As a result, electrical resistance in such motors is higher, more starting current is required, and field strength is lower in shifting pole rotors of a given size and power rating.

The field of the rotor 306 is configured to be energized by a magnetic field produced by the stator windings 304. The rotor 306 and the stator 302 are configured to move relative to one another responsive to the energized rotor field. The rotor 306 is substantially energetically isolated from components of the stator 302 except for the stator windings 304.

Within electric machines, a stator and a rotor can be coupled to enable power transfer, signal transfer, and/or field modulation during operation. Couplings may be classified as direct coupling or indirect coupling. Direct coupling occurs between the stator and rotor along the primary operating air gap, such as the air gap 314. Indirect coupling occurs along a secondary interface away from the primary operating air gap.

Direct couplings are typically characterized as inductively coupled, for example, a squirrel cage induction rotor is considered to be directly coupled to the stator. While direct coupling is common and easily controlled in an asynchronous machine, direct coupling with synchronous machines, for reasons described throughout this disclosure, are difficult to control. For example, a rotor position often needs to be known to ensure that a current magnitude and/or frequency is properly maintained.

Indirect couplings operate along a secondary coupling and may be radial oriented or axially oriented, and may communicate via electrical contacts, inductive couplings along a separate air gap, capacitively coupled, or optically coupled. While secondary coupling may be used for a variety of functions to improve the efficiency and/or overall controllability of an electric machine, additional components are often required that can increase the weight, complexity, failure frequency, and costs (both operating and capital costs) of machines that take advantage of such systems.

Couplings may further be classified as either power couplings or signal couplings. Power couplings transmit power from the stator to the rotor to be used to directly drive magnetomotive force along the primary operating air gap, thereby generating torque. Signal couplings transmit signals between the stator and rotor that may be used to separately adjust an electric circuit within the rotor or monitor a rotor condition, such as temperature or position relative to the stationary reference frame. Signal couplings transmit at a very low power level relative to the power rating of a motor, for example, less than 5% of the power rating of the motor. In some implementations or under some operating parameters, it may be desirable for the signal couplings to transmit power at a level relative to the power rating of the motor of, for example, 7.5%, 5%, 3%, or 2.5%.

Energetically isolated motors and generators, such as those described throughout this disclosure, primarily (within standard electromagnetic shielding tolerances) use direct coupling to transmit power and signals between the stator and the rotor without the use of an indirect or secondary coupling. The electric machines described herein include direct coupling between the rotor 306 and the stator 302 for both power coupling and signal coupling.

In some implementations, a wound rotor may need to be, or benefit from being, charged when located on position D, as illustrated in FIG. 3B, or transitioning from the position D to position Q through modulation of the current phasor angle. Charging may mean generating current in the rotor winding, or windings, or transferring, increasing, or storing magnetic flux in the rotor, each of which may involve some power transfer from the stator to the rotor. Such a task can be accomplished in a variety of ways, for example, by advancing modulating a current phasor angle of stator excitation (e.g., advancing or retarding the current angle of stator excitation as appropriate), increasing a frequency of change in the stator excitation current phasor angle, increasing magnitude of excitation current in the stator (or any of its resultant signal components), or any combination thereof. In some instances, the rotor field may need to be weakened (e.g., decreasing the level of current or magnetic flux present in the rotor and/or rotor field winding), for example, when by operating on or near position D' (e.g., by transitioning from position Q to position D', or from position D' to Q'). Such a task can be accomplished in a variety of ways, such as modulating the current phasor angle (e.g., advancing or retarding the current angle of stator excitation as appropriate), decreasing the frequency of stator excitation current angle phasor change, decreasing the magnitude of excitation current in the stator (or any of its resultant signal components), or any combination thereof. Alternatively or in addition, field weakening can be accomplished through a passive loss of rotor field winding current via ohmic losses. In operation, a frequency and harmonic independence can be observed in some implementations between the signal emitted by the stator, and the base operating frequency that determines rotor speed. As will be described, the present disclosure recognizes that control of the motor can be achieved in a way that prioritizes additional goals beyond just moving the rotor, such as increasing the efficiency of the system, controlling the losses in the system, or mitigating the potential for operational circumstances that could damage or reduce the effectiveness of the system. Further details on such a system are described throughout this disclosure, for example, FIG. 6 and the associated description.

FIGS. 3C-3D are perspective and side views of an example electric machine 350. The electric machine 350 is substantially similar to the electric machine 300 with the exception of any differences described herein. The rotor 356 includes six rotor poles 358. The stator 352 includes a distributed winding 354. The electric machine 350 has six rotor teeth (poles 358) and thirty-six stator teeth 370, resulting in a rotor tooth to stator tooth ratio of 1:6. This is different from the electric motor 300, which includes four rotor teeth (poles 308) and twelve stator teeth 320, resulting in a rotor tooth to stator tooth ratio of 1:3. Other rotor teeth to stator teeth ratios can be used without departing from this disclosure, for example, ratios of 1:2 or 1:4 can also be used. Other ratios of rotor teeth to stator teeth can be used without departing from this disclosure regardless of whether salient, concentrated stator winding are used or if distributed stator windings are used.

Figure 4:
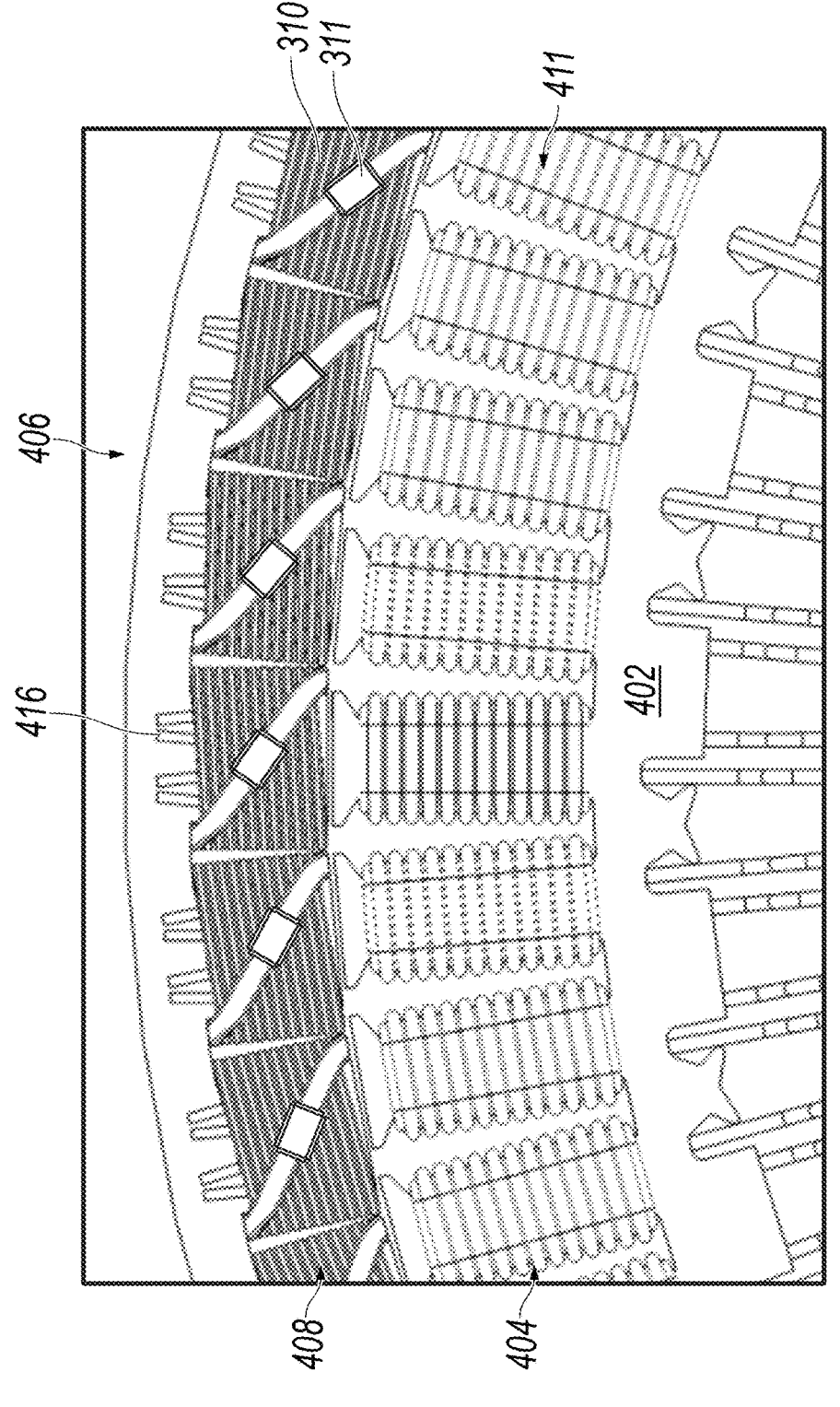
FIG. 4 is a side view of an example electric machine.

FIG. 4 is a side views of an example electric machine 400. The electric machine 400 is substantially similar to the electric machine 300 previously described with the exception of any differences described herein. The rotor 406 is an external rotor while the stator 402 is an internal stator. In other words, the rotor 406 surrounds the stator 402 and rotates around the stationary stator 402. The stator 402 defines stator poles 411 with concentrated, salient, non-overlapping stator coils 404. The rotor 406 includes permanently magnetic material 416 embedded within the rotor 406. As illustrated, each rotor pole 408 includes four channels of permanently magnetic material 416 arranged in a substantial "M" or "W" configuration; however, other arrangements can be used without departing from this disclosure. The permanently magnetic material 416 can be include a variety of material, including ferrite, SmFeN, N35, N45. While lower power permanently magnetic material is typically used, higher powered magnetic material in lower quantities can be used without departing from this disclosure. The permanently magnetic material 416 can extend across the entire longitudinal length of each rotor pole 408 or partially across each rotor pole 408. In some implementations, the permanently magnetic material 416 can be made-up of multiple layers or laminations.

As illustrated, the permanently magnetic material 416 results in a net magnetic force that is substantially aligned with each rotor pole 408. In some implementations the permanent magnetic material can be arranged such that the net magnetic force from the permanent magnetic material 416 is miss-aligned from the rotor poles 408. In general, the arrangement of the permanent magnetic material is dependent upon the desired cross-sectional flux density of the magnetic materials within the rotor. In implementations where the permanent magnetic material 416 is located within a rotor coil 310, the flux for each set of permanent magnetic material 416 can be individually adjusted and/or modulated by adjusting the charge of the surrounding rotor coil 310. Such implementations also protect the magnets from demagnetization that can be caused by a strong stator field. In implementations where the permanent magnetic material 416 is not surrounded by a rotor coil, an adjustment in flux caused by the stator field can affect multiple sets of permanent magnetic material 416 within the rotor 406.

Figure 5A:
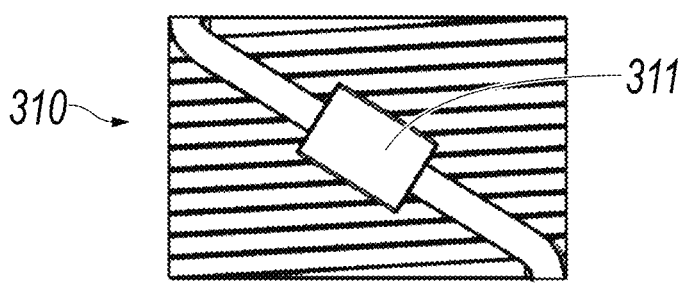
FIG. 5A is a front views of example rotor coil.
Figure 5B:
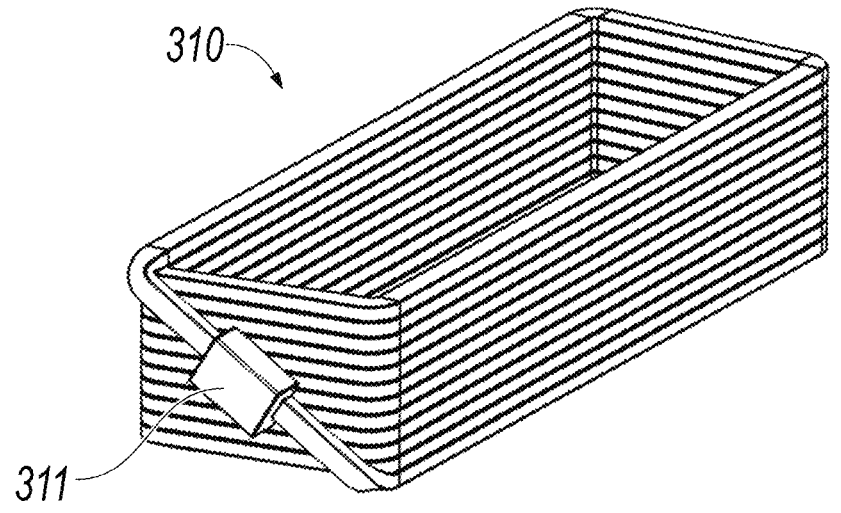
FIG. 5B is a perspective view of the rotor coil of FIG. 5A.
Figure 5C:
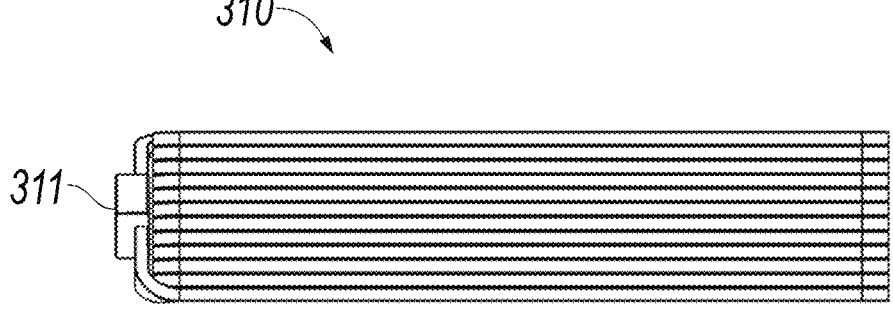
FIG. 5C is a side view of the rotor coil of FIGS. 5A and 5B.

FIGS. 5A-5C are front, side, and perspective views of example rotor coils 310. As illustrated in FIGS. 3A, 3B, and 4, each rotor coil 310 acts as its own winding with a single coil around each pole, such as rotor pole 308 or 408. As such, the rotor can be described as including concentrated, salient, and/or non-overlapping windings. In some implementations, the winding direction of each coil can alternate with each adjacent rotor pole 308 or 408. For example, in implementations using a stator with salient, concentrated, and/or non-overlapping windings, such an arrangement can be used. Alternatively, the rectification direction of the rectifier 311 can alternate with each adjacent pole with similar results. In some implementations, the winding direction does not need to alternate between adjacent rotor poles. For example, in implementations using a stator with distributed windings, such an arrangement can be used. While the rotor coils 310 are illustrated as a single coil of wire shorted upon itself, other geometries can be used so long as each coil shorts upon itself and does not overlap with an adjacent coil. In some implementations, poles with like polarities can be shorted to one another, for example, to share a rectifier. Similarly, poles with opposite polarities can be shorted to one another depending on the winding direction of each pole. In general, rotor coils are often configured such that the electrical current skin depth of the power transfer frequency fully penetrates the conductor of the coil. "Electrical current skin depth" in the context of this disclosure refers to the depth from the surface of a conductor at which electric current mainly flows, particularly eddy current induced from a magnetic field changing at a given frequency. For a given material, skin depth can be calculated as:

$$\delta \approx 1 / \sqrt{\pi f \mu \sigma} \tag{2}$$

where 'f' is the magnetic switching frequency, μ is the magnetic permeability (in H/mm) of the material, and σ is the electrical conductivity of the material. Achieving full skin depth penetration within the rotor coils 310 allows for a uniform inductance within the rotor coils 310. In some implementations, drive frequencies can extend between 0 hertz and 20 hertz. In some implementations, drive frequencies can range between 100 hertz and 2000 hertz. In general, the rotor coils are arranged such that a decay of a magnetic flux within the rotor is resisted by current within rotor coils in response to a magnetic field shift from the stator.

Traditionally, synchronous motors do not have magnetizing current to magnetize a material so magnets have to be magnetized at the factory or prior to installation. To that effect, if the magnetic material demagnetizes under operation (e.g., because the stator is putting too much of a load on it) the magnet can be damaged, or the motor can be rendered inoperable entirely. The rotor coils 310 help protect the permanent magnets from the potential demagnetization effects of the stator.

The rectifier 311 within each of the rotor coils 310 helps reduce torque ripple in the motor during operation. The rectifier does this by reducing a delay of energization of flux in an air gap 314. While the rotor coils 310 resist a decay of a magnetic flux within the rotor by current within rotor windings in response to the magnetic field shift, the rotor coils 310, without rectification, perform this function regardless of the portion of the drive cycle the rotor coils 310 are exposed to. That is, unrectified rotor coils are symmetrical to both a positive portion of a drive frequency and a negative portion of the drive frequency. Such an arrangement can produce a measurable amount of torque ripple. For rotor coils 310 that include the rectifier 311, the rotor coils 310 allow a first change of flux by inducing a first current in a first direction within the rotor windings until the first current decreases to zero, and allowing a second change in flux to induce a current in a second direction within the rotor windings. That is, the current within the rotor windings is unidirectional, producing an asymmetric response and reducing torque ripple during operations.

In operation, the current flowing through the coils (310, 410) and the rectifier are allowed to reduce to zero. Such an operation is performed by reducing the current phasor angle 318 to less than 90° (that is, "pulling" the pole, rather than "pushing" the next adjacent pole). The current within the coil (310, 410) and the rectifier 311 are allowed to decay within a duration of time that the current phasor angle is less than 90°. Such a duration of time can range from a few milliseconds to two seconds depending upon the speed and saturation of the rotor (306, 406). Then, the current phasor angle is increased as current with the coils (310, 410) increases. Throughout this process, the current magnitude can be modulated in conjunction with the current phasor angle 318 to counteract ripple current when adjusting phasor angle 318.

Figure 5D:
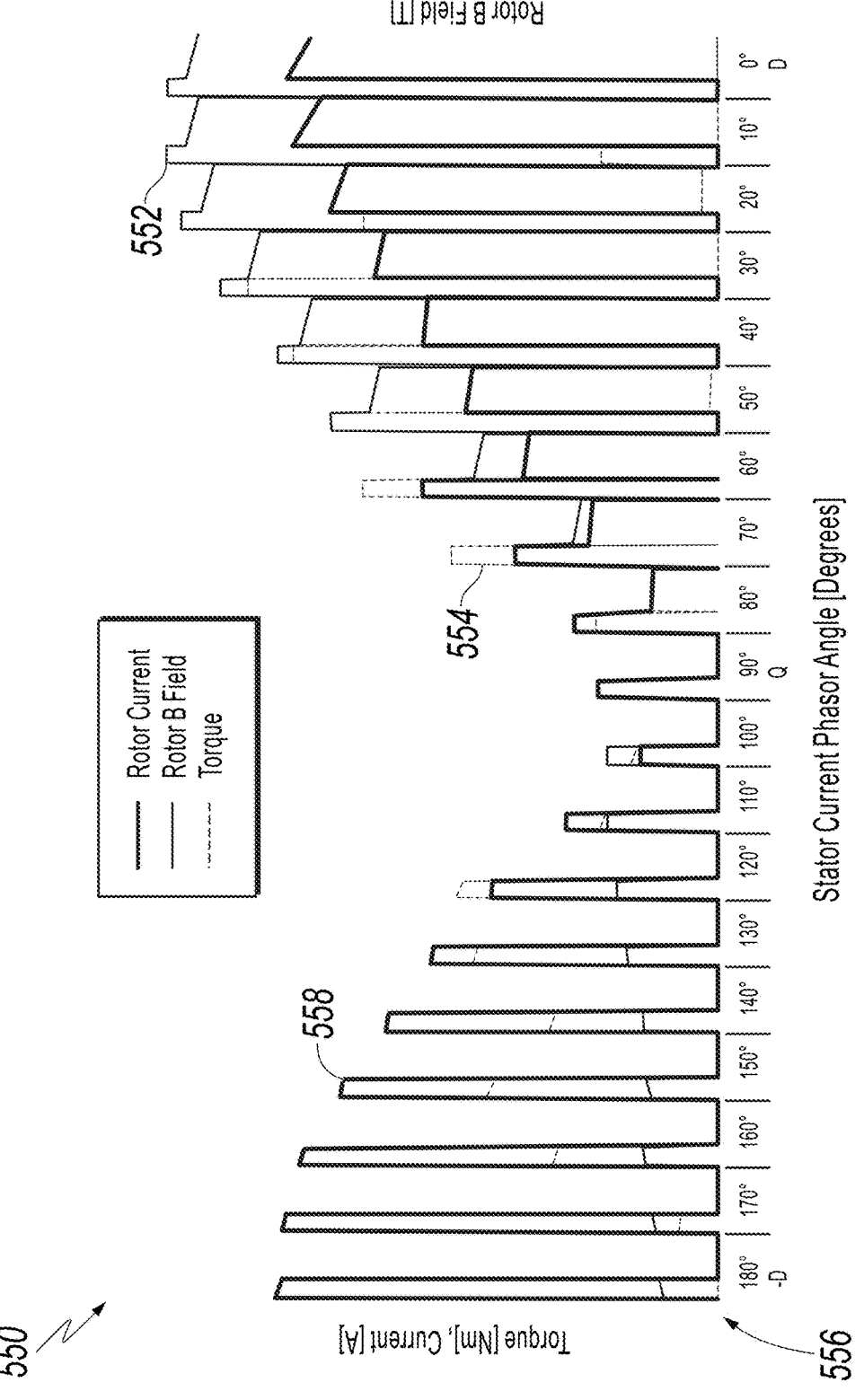
FIG. 5D is a graph illustrating various charge states and torques produced and different phasor angles under a locked-rotor condition (e.g., startup).

FIG. 5D is a graph 550 illustrating various charge states 552 and torques 554 produced and different phasor angles 556 under a locked-rotor condition (e.g., startup). At high current angles (left side) the rotor current 558 is shown to be highly reactive to instantaneous stator current excitation. High levels of charge 552 can be seen when operating between the Q-axis (90°) and the D-axis (0°), with substantial inductive decay (e.g., maintaining a field).

Torque 554 is shown to be relatively at high current angles 556 due to the low concentration of stator Q-axis current. The decay can be observed by the current 558 passing through the rotor coil (310, 410) to resist the change in flux.

Under such a control scheme (combined with the coils 310 or 410), the rotor field can be modulated based upon the current phasor angle 556. This can translate into a wide operating envelope during operations. As can be seen in the graph 550, the D-axis 312 to Q-axis operation demonstrates the shielding effect that would protect magnetic material, which allows less magnetic material, lower coercivity material, or both. As the stator Q-axis current increases, the rotor current is shown to have a larger contribution to torque production (130-120 degrees). At 90 degrees, the current is transverse to the rotor D-axis and no net current is produced.

Another benefit is that the field weakening with D-axis injection not constant, as compared to that of a permanent magnet motor. Similarly, the rotor field can be modulated by the current magnitude passing through the stator. In many cases, both the current magnitude and the current phasor angle 556 can be adjusted simultaneously for desired rotor field modulation. The rotor current at phasor angle of less than 90 degrees is shown to be countercyclical to the excitation current, due to the presence of a rectifying circuit. Rotor field increases during these periods due to the net D-axis injection and reactive field decay between stator excitations.

Controls may be used to further limit torque ripple by modulating the current phasor angle for a desired rotor field modulation. Rotor flux may be transmitted from the stator to the rotor through modulation on the D-axis of the machine in the synchronous reference frame. This current magnitude, or amplitude, modulation may alter (reduce) the current phasor angle during the duration of the modulation, at the frequency of the modulation. A higher frequency of modulation may further reduce torque ripple, particularly torque ripple of the system where higher frequency harmonics are dampened and/or filtered by the system which may include the inertial mass of the powertrain or vehicle load, or even the rotor itself.

Figure 6:
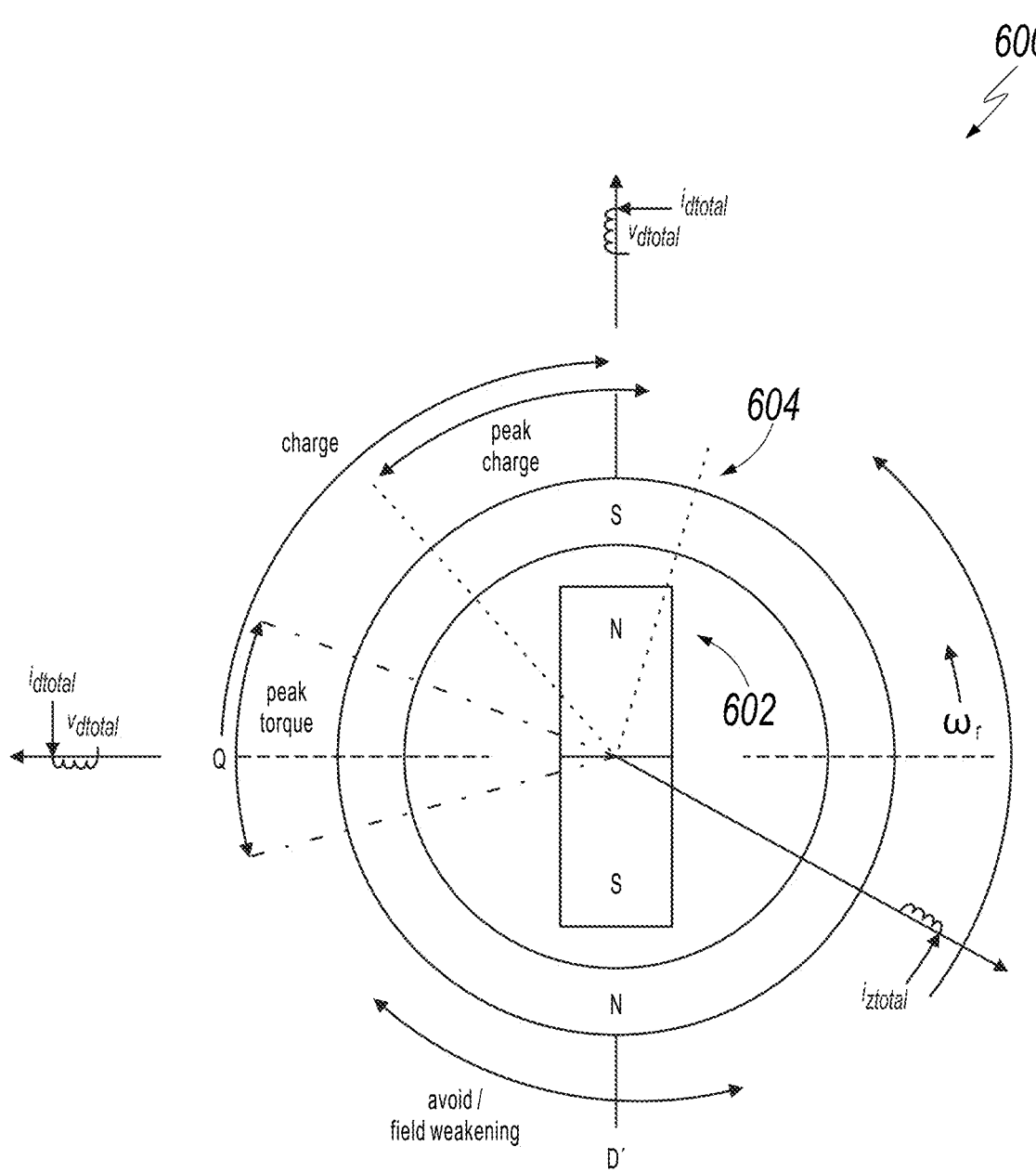
FIG. 6 is a schematic diagram of an electric motor configured for control in accordance with the present disclosure.

In some instances, torque ripple is also be limited, or substantially reduced, by respecting the desired current angle appropriate for maximum torque production while modulating the current magnitude, or amplitude, on the D-axis of the machine in the synchronous reference frame. In such instances, the controller proportionally modulates the current magnitude, or amplitude, on the Q-axis in the synchronous reference frame with respect to the modulation on the D-axis. In some instances, such a proportional modulation of the Q-axis magnitude is 5-10%, 10-20%, 20-40%, or 50-100% of the D-axis modulation. In some instances, the allows a tolerance of oscillation about a set, or desired, current angle for maximum torque production. In some instances, such tolerance are 0-1%, 0-5%, 5-10%, 10-30%, or 30-60% variance from the set current angle. The smaller the oscillation tolerance, the tighter the controller is able to control torque ripple assuming enough priority has been provided by the controller to maintain the rotor field at an appropriate level of magnetic flux. These oscillation tolerances may also be described as duty cycles of stator energization To further describe such a control scheme, FIG. 6 illustrates a schematic diagram of an electric motor 600 with alignments between the rotor 602 and the stator 604. Position D is defined as opposite stator 604 and rotor 602 poles being aligned (i.e., N-S and S-N). Position Q and Q' is defined as fully unaligned poles (i.e., approaching similar poles and opposite poles respectively) or electrically orthogonal to D, and D' as similar stator 604 and rotor 602 poles are aligned (i.e., N-N and S-S). In some implementations, especially in rotors with high saliency, peak toque occurs between the D and Q positions in the synchronous reference frame (e.g., due to its reluctance component). In other implementations (e.g., machines with less salience) such as round rotors, peak torque occurs between Q and D' positions. In instances where a permanent magnet motor is used, peak torque operation can cause demagnetization at high load and require field weakening at high speed. Weaker magnets can be used to the detriment of size/weight and/or torque production.

In some embodiments, permanent magnets may be used. To increase the magnetic current capabilities without risk of demagnetization, the rotor windings described herein are used. At lower torques, rotor winding current can be allowed to reduce lowering cogging (resistive) torque and eliminating the need for active flux weakening of stronger permanent magnets. Using the modulation of the current phasor angle herein, the wound rotor can be flux weakened or strengthened (e.g., current decrease or increase within the rotor field winding and flux within the rotor pole itself) through control mechanisms. As one non-limiting example, the current phasor angle of the synchronous excitation from the stator may be modulated. In at least some configurations, there is no need for a secondary control system or additional commutation hardware such as in a wound rotor synchronous motor, for example, such as to control the stator field).

As described herein, wound rotor configurations in accordance with the present disclosure do not require additional stator-to-rotor coupling elements. Rather, signals are transmitted using the stator windings and rotor windings along with the rotor laminations. This reduces costs and componentry, increases performance (e.g., eliminating ohmic losses of brushes), eliminates or controls physical contacts and wear components, reduces package size, and provides control flexibility compared to schemes that incorporate special detectors, sensors, wired or wireless connections, or brushes to transmit signals from stator to rotor.

As described throughout this disclosure, in a system where control signals can be transformed into D-Q-axis components, such as illustrated in FIG. 6, a third z-axis component is also present and can be described as the signal or magnetic quantities that do not map directly onto the D- or Q-axis. For example, a component orthogonal to the plane in which the Q and D components can be defined, as illustrated.

In operation, field oriented or vector controls with specific modulations (e.g., signal, or signal parameter modulations) may be used to control various aspects of the rotor field. These modulations can be used to adjust signal excitations that couple between the stator and rotor, as well as control the stator excitation wave (e.g., relative position and magnitude) with respect to the rotor. Thus, a direct correlation of rotor response, or current induced in a rotor winding, can effectively be "steered" by the stator and inverter. In other words, such control can create dynamic behavior of a machine that is a function of currents in a D-axis and Q-axis fields, as coordinated by a controller, such as controller 104 or controller 700 (FIG. 7). Amongst other strategies (e.g., torque production), vector modulation can be used to help define the modulation of the current phasor angle.

The present disclosure recognizes that vector control modulation may be used to directly affect rotor reactions through stator signals that are imposed. Furthermore, these rotor reactions may be modulated on either the D-axis or Q-axis and may be realized using current phasor angle modulation. The relative effectiveness of current phasor angle modulation may be proportionate to both the magnitude and the percent change of the modulation (e.g., over a time period). The speed of adjusting a current phasor angle can vary on the controller and may be selected on the intended response in the rotor material or rotor response. In some cases, a frequency can be chosen based upon the speed of the machine and, in other cases, a fixed modulation can be chosen. The frequency of the modulation may be selected based on a variety of considerations. For example, in some configurations, the frequency may be at least 2-4 times higher than the fundamental frequency of the machine. In other situations, the modulation may be 5-10 times higher than the fundamental frequency of the machine. In still further, configurations, the frequency may be 10-30 times higher than the fundamental frequency of the machine. For example, the frequency, in some configurations may be selected to prevent an interaction with torque generation (e.g. to reduce torque ripple).

Current phasor angle can be controlled using a vector component control, which may be described by letting $i_d$, $i_q$, and $i_z$ be the currents at fundamental frequency represented in the D-Q reference frame illustrated in FIG. 6 (e.g., principal control components that comprise the current phasor angle). These signals may be modulated directly, or alternatively, it is possible to add an independent excitation modulation in any of the D/Q axes that is added onto the fundamental currents resulting in a total stator current:

$$i_{d_{total}} = i_d + i_{d_{modulation}} \tag{3}$$

$$i_{q_{total}} = i_q + i_{q_{modulation}} \tag{4}$$

$$i_{z_{total}} = i_z + i_{z_{modulation}} \tag{5}$$

where $i_d$, $i_q$, and $i_z$ are the normal excitation currents along each axis, $i_{d_{excitation}}$, $i_{q_{excitation}}$, and $i_{z_{excitation}}$ are the independent modulation signals that can be selected and controlled by the motor controller or other controller, as will be further described. Modulations can be chosen to be sinusoidal or take any form, for example, such modulation can be further described as:

$$i_{d_{excitation}} = m_d \cos(w_d t) \tag{6}$$

$$i_{q_{excitation}} = m_q \sin(w_q t) \tag{7}$$

$$i_{z_{excitation}} = m_z \sin(w_z t) \tag{8}$$

The modulation magnitude and frequency can be chosen independently per component and vector sum to alter the current phasor angle, or by controlling the current phasor angle ($\gamma$) directly to alter the principal components:

$$i_{d_{total}} = i_d * \cos(\gamma) \tag{9}$$

$$i_{q_{total}} = i_q * \sin(\gamma) \tag{10}$$

$$i_{z_{total}} = i_z * \sin(\gamma) \tag{11}$$

Similarly, modulations may be made about a set current phasor angle such as:

$$i_{d_{total}} = i_d * \cos(\gamma + \gamma_{modulation}) \tag{12}$$

-continued $$i_{q_{total}} = i_q * \sin(\gamma + \gamma_{modulation}) \tag{13}$$

$$i_{z_{total}} = i_z * \sin(\gamma + \gamma_{modulation}) \tag{12}$$

where $\gamma_{modulation}$ may be, for instance, described as a sinusoidal oscillation about a fixed current angle:

$$\gamma_{d_{modulation}} = m_d \cos(w_d t) \tag{13}$$

$$\gamma_{q_{modulation}} = m_q \sin(w_q t) \tag{14}$$

$$\gamma_{z_{modulation}} = m_z \sin(w_z t) \tag{15}$$

In each case, modulations may be applied to a single axis, whereby no modulation is applied to the other two axes and are used to generate a rotor response. Alternatively or in addition, a D-axis current modulation can be used, or varied alongside a Q-axis current modulation, with the goal of controlling or minimizing torque ripple. A Q-axis modulation can be used if the D-axis modulation is insufficient. In some implementations, a Q-axis modulation is used in combination with D-axis modulation to form a rotating vector injection. Z-axis modulation does not inherently effect the torque ripple and does not require knowledge of the D-Q reference system. However, Z-axis modulation is often limited in effect on the rotor, but may be used for coupling the stator to the rotor for either power or accessory information coupling (e.g., speed and/or position).

The frequency of current modulation, or current phasor oscillation, may be described by a duty cycle. This duty cycle may describe the operation divided between fluxing (e.g., D-axis) and torque producing (e.g., Q-axis) principal components. In startup conditions, the duty cycle may be 100%, or 75-100% or 40-100% on the D-axis for hard fluxing of the rotor before splitting operation between the D-axis and Q-axis for torque production where there may be a 50%-50% split, 30%-70%, 20-80%, 10-90% split (D-axis: Q-axis). This may also appear as an oscillation about a current phasor angle wherein the current phasor angle and resultant magnetic field vary about an angle by 5 degrees, 10 degrees, 20 degrees or, in some cases, 30-45 degrees during steady state or quasi-steady state operation. In some implementations, the frequency of oscillation or amplitude modulation can be varied to both elicit a rotor response and/or to limit torque ripple in operation.

Additionally, the control strategy may utilize higher frequency operation, or pulses, to limit the amount of flux that decays over time in the rotor coils. That is, by shortening the time step between the MMF cycles of the rotor (which decay over time), it is possible to decrease the variance of flux crossing the rotor coils to harden the flux and reduce any negative torque moments or associated torque ripple. Additional signal modification may be used, such as a skewed signal, trapezoidal, or pulse width modulation (PWM) techniques, to help flux the rotor, limit torque ripple and smoothen the transition between current phasor angles in operation.

Because stator-side currents may correspond to stator-side voltages, a scheme including signals embedded in currents may correspond to an equivalent scheme including signals embedded in voltages. Implementations described throughout this disclosure in reference to signals in stator-side voltages may be equivalent to, and may also describe signals in stator-side currents, and vice-versa.

As previously described, control of the rotor field can be manipulated by the controller through the stator windings using current phasor angle modulation. This modulation can be defined by a magnitude and a frequency and can be observed by the magnetic field of the machine, stator excitation, as well as the principal control components. Current phasor angle modulation can be used to transfer power to the AC coil, where oscillations in current angle are defined about a set operating point of current angle as defined by the D-Q reference frame (e.g., a current angle can be modulated to achieve a target torque per ampere, MTPA). Current phasor angle modulation perturbations can be defined by an oscillation of the excitation field, a magnitude, and a frequency. Current magnitude modulation at a given current phasor angle can be used to transfer power to, or induce a reaction within the rotor, where the greatest response can be seen at the current angle (in the D-Q reference frame of a given pole) of greatest coupling to the rotor. For instance, for a wound rotor that is aligned with the D-axis with respect to the synchronous reference frame axis, then the greatest power transfer would occur at a phasor current angle of 0° electrical (where 0° electrical is defined as the D-axis of the synchronous reference frame).

In some implementations, alternating direction of the rectification effectively means that the polarity of each rotor pole is reversed from its neighbors. In other words, a four pole machine has N-S-N-S. Alternatively, to achieve such an alternating pole arrangement, the direction of the windings can be reversed from pole to pole to establish appropriate polarity (e.g., when a single coil and rectifier are used). Alternatively, unidirectional windings may be used wherein the rectifiers themselves are directionally flipped from pole to pole to offer appropriate polarity on the rotor.

In some implementations, individual or parallel rotor coil windings are used to establish local flux conditions within the machine. in some implementations, grouped or series coils rotor coil winding(s) are used to balance the rotor current and flux across the machine. This may be done as a function of machine periodicity, or symmetry. Combinations of individual and group, parallel and series, windings may be used to achieve local regions of control and distributed balance across the rotor or machine.

FIG. 7 is a block diagram of an example controller 700 that can be used with aspects of this disclosure. Controller 700 FIG. can be used in addition to or in lieu of motor controller 104 previously described. In the former instance, controller 700 and motor controller 104 can be combined into a single, integrated controller, or controller 700 and motor controller 104 can be separate, discrete controllers. The controller 700 can, among other things, monitor parameters of the electric machine (300, 400) and send signals to actuate and/or adjust various operating parameters of the electric machine (300, 400). As shown in FIG. 7, the controller 700, in certain instances, includes a processor 750 (e.g., implemented as one processor or multiple processors) and a memory 752 (e.g., implemented as one memory or multiple memories) containing instructions that cause the processors 750 to perform operations described herein. The processors 750 are coupled to an input/output (I/O) interface 754 for sending and receiving communications with components in the electric machine (300, 400), including, for example, a rotor position sensor or a current sensor. In certain instances, the controller 700 can additionally communicate status with and send actuation and/or control signals to one or more of the various electric machine components (including power or drive signals to the stator) of the electric machine (300, 400), as well as other sensors (e.g., temperature sensors, vibration sensors, and other types of sensors) provided in the electric machine (300, 400). The communications can be hard-wired, wireless, or a combination of wired and wireless. In some implementations, the controller 700 can be a distributed controller with different portions located within different locations, for example, different parts of a vehicle. Additional controllers can be used in conjunction with controller 700 as stand-alone controllers or networked controllers without departing from this disclosure.

The controller 700 can have varying levels of autonomy for controlling the electric machine (300, 400). For example, the controller 700 can begin sensing a change in load and/or speed, and an operator adjusts the power frequency, current magnitude, and/or current angle. Alternatively, the controller 700 can begin sensing a change in load and/or speed, receive an additional input from an operator, and adjust the frequency, current magnitude, and/or current angle with no other input from an operator. Alternatively, the controller 700 can begin sensing a change in load and/or speed and adjust the frequency, current magnitude, and/or current angle with no input from an operator.

For example, in operation, the controller can be a controller configured to energize the stator windings and produce the stator magnetic field within the stator by sending a control signal to the stator windings. The controller can be configured to produce the stator magnetic field by sending a current through the stator at a current angle and magnitude, and actively adjusting the current angle and magnitude depending upon operation conditions of the electric machine (300, 400). Alternatively or in addition, the controller can receive a position stream from the position sensor 316. The position stream is representative of the rotor position. The position stream can be an analog or digital electrical or electromagnetic signal. Responsive to receiving the position stream, the controller can determine the presence, absence, or severity of any torque ripple that is present. The controller can then adjust a current angle and/or current magnitude responsive to determining a torque ripple is present.

In some implementations, the phasor current angle 318 is increased ahead of the rotor pole (308, 408) in the direction of movement during high torque conditions. That is, in instances where greater current per torque unit is required can lead to an increased phasor current angle 318. In general, as the current phasor angle 318 increases, the rotor coils (310, 410) become more active (more current flowing through the coils) due to a lessened D-axis component 312. In other words, the field of each rotor winding decays faster as the current phasor angle 318 increases. The greater activity within the coils can lead to increased torque ripple without mitigation; however, a current amplitude can be increased during the increase the D-axis component experienced by each pole, counter acting the potential negative torque produced by the increased current angle 318. Alternatively or in addition, the phasor current angle 318 is decreased during high-speed, low torque operations. Alternatively or in addition, the current angle can become negative during braking operations. Regardless of the operating mode used, the controller 700 is capable of adjusting the current angle and/or the current amplitude to meet the present demands of the electric machine (300, 400) in a given situation.

In particular, current phasor angle or the current amplitude of a machine's principal components may be adjusted across operation to generate torque. In some instances, for example, when a rotor has a sufficient field strength, no magnetizing (or less) current may be applied when compared to previous time steps. In other instances, such as high speed operation, the rotor field may be allowed to degrade to reduce the back electromotive force (EMF) and provide voltage headroom, reduce cogging torque to limit torque ripple, and avoid active field weakening operation. The controller is capable of communicating with the rotor, through the stator, at a wide range of frequencies, for example, between 50 and 1000 Hertz (Hz). In some implementations, the communication occurs between 100 and 1000 Hz. Regardless, the system is able to communicate changes faster than traditional systems. For example, a traditional squirrel-cage induction machine communicates at substantially 7 Hz. The ability for higher frequency transmission allows for the controller 700 to actively reduce torque ripple, regardless of operating condition, and to quickly adjust to changes in operating conditions.

FIG. 8 is a flowchart of a method 800 that can be used with aspects of this disclosure. All or part of method 800 can be performed by the controller 800 and/or motor controller 104. At 802, stator windings of a stator are energized to produce a stator magnetic field within the stator. At 804, a corresponding rotor magnetic field, within ferromagnetic material within a rotor, is modified by the stator magnetic field. At 806, a force tangential to the rotor is generated by a shift in the stator magnetic field. At 808, the rotor is moved by the generated tangential force. The stator magnetic field and the rotor maintain synchronicity with one another during operation. At 810, a delay of energization of flux in an air gap is reduced by a rectifier. The air gap is defined by an inner surface of the stator and an outer surface of the rotor.

At 812, a decay of a magnetic flux within the rotor is resisted by current within rotor coils in response to the magnetic field shift. The resistance in flux decay is not symmetric due to the inclusion of the rectifier 311 on the individual rotor coils 310. As such, a first change of flux is resisted by inducing a first current in a first direction within the rotor windings until the first current decreases to zero, and a second change in flux is allowed to induce a current in a second direction within the rotor windings.

In some instances, at 814, a current is sent through the stator at a current angle. Typically, the current angle is ahead of a rotor pole in the direction of movement. In some instances, at 816, a current magnitude of the current is adjusted responsive to changing operating conditions. At 818, a current angle relative to the rotor pole (the D-axis) is adjusted responsive to changing operating conditions. Notably, 814 and 816 are shown in dotted form because both steps are not required, nor required in that order. That is, current magnitude and current angle may be independently adjusted.

Thereafter, the operational output of the electric machine at the current time is compared to the desired operational output of the electric machine. If the operational output of the electric machine at the current time is at the desired operational output of the electric machine, the machine continues operating using the most-recently adjusted parameters of stator current. If not, the process iterates back to adjust at least one of the current magnitude or the current angle of the stator current until the operational output of the electric machine at the current time is at the desired operational output of the electric machine.

Figure 9A:
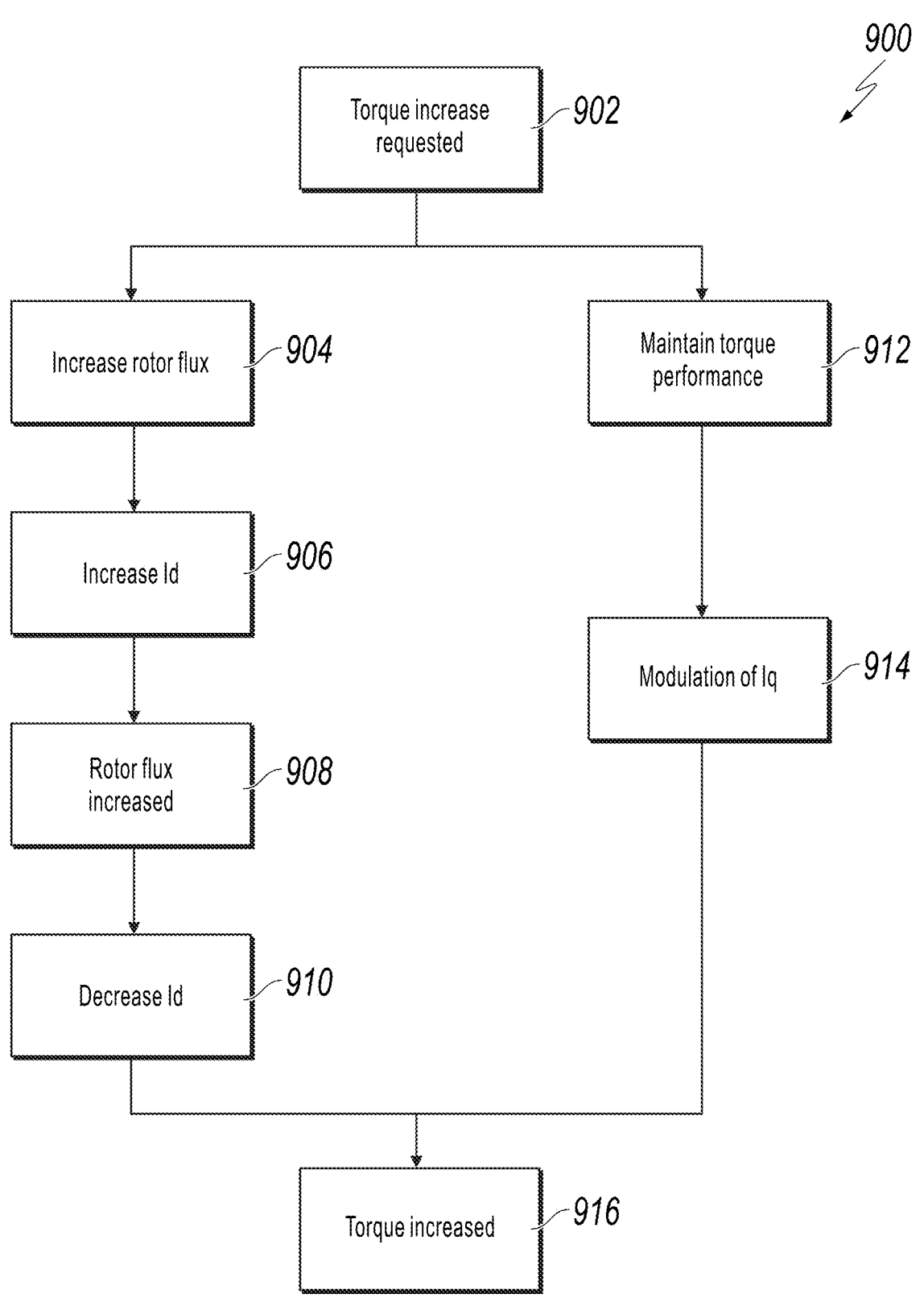
FIG. 9A is a flowchart of a method for responding to a torque increase request in accordance with an aspect of this disclosure.

Referring now to FIG. 9A, one non-limiting example of a process control in accordance with the present disclosure is provided. In particular, FIG. 9A provides an example flowchart for controlling a motor system in accordance with the present disclosure to deliver increased torque 900. The process 900 begins with a demand or request for increased torque at 902. In accordance with the present disclosure, meeting this request can be conceptualized as performing two parallel workflows. However, in practice, the controller need not be programmed or designed to operate with independent, parallel, or otherwise distinct flows. To meet the request for increased torque 902, the controller determines that achieving the increased torque can be done by increasing rotor flux at 904. This to do so $I_d$ is increased at 906, which increases the rotor flux at 908. This continues until the desired rotor torque is achieved and then $I_d$ is decreased at 910. However, while seeking to increase rotor flux, the controller recognizes a Q-axis current modulation can be used, or varied alongside a D-axis current modulation, with the goal of controlling or minimizing torque ripple. Thus, the controller also works to maintain torque performance at 912. To this end, the controller also modulates $I_q$ at 914 to, thereby, yield the desired torque increase at 916, but without the ill effects of instable torque performance, such as can be caused by torque ripples.

Figure 9B:
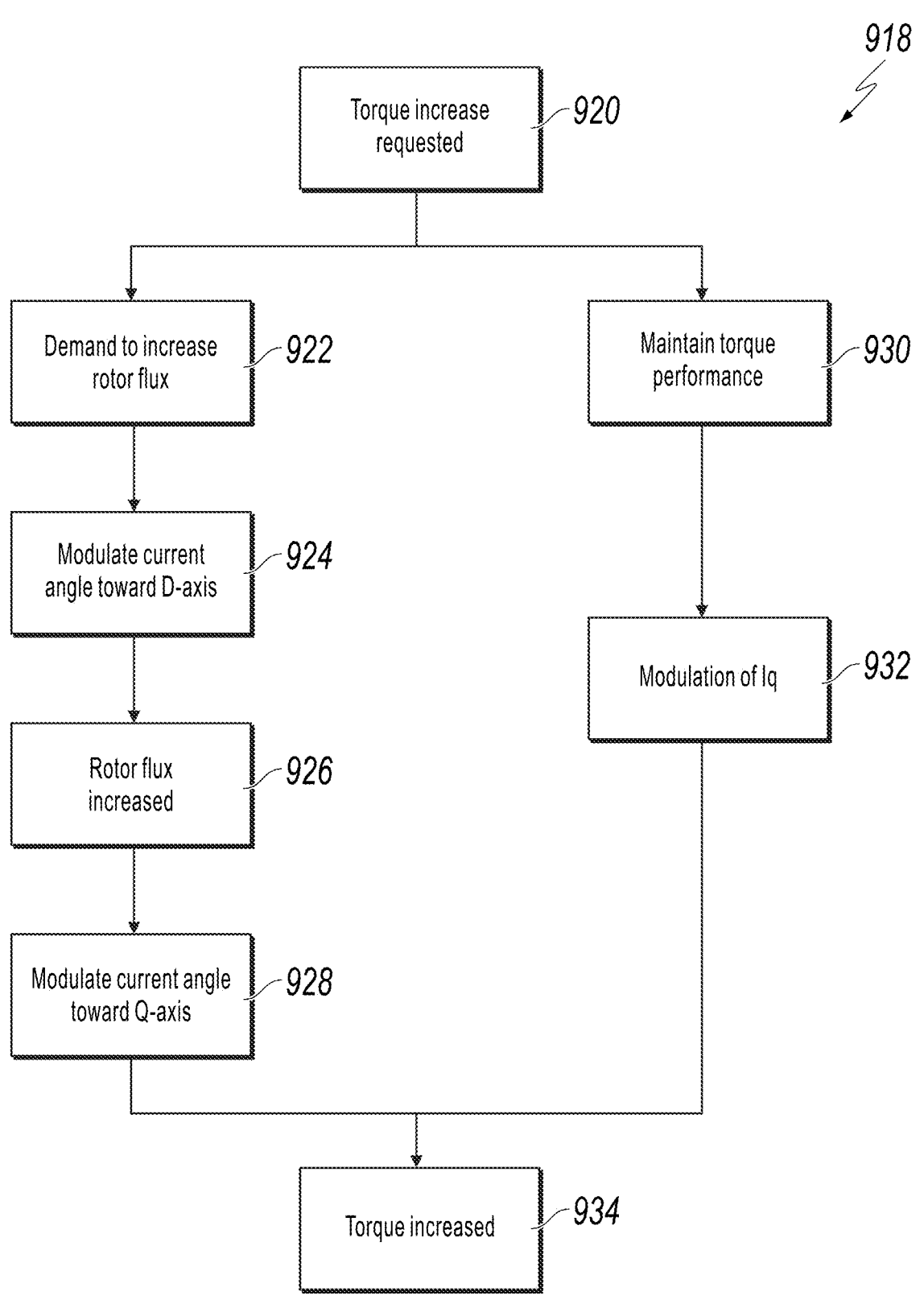
FIG. 9B is another flowchart of a method for responding to a torque increase request in accordance with an aspect of this disclosure.

Referring now to FIG. 9B, another non-limiting example of a control process 918 for responding to a request for increased torque at 920 is provided. In response to the request at 920, the controller determines that achieving the increased torque can be achieved by demanding an increase in rotor flux at 922. To achieve this, the controller seeks to modulate the current angle toward the D-axis at 924, because this will readily increase the rotor flux at 924, which is further controlled by modulating the current angle toward the Q-axis at 928. In parallel, the controller works to maintain torque performance at 930 by modulating $I_q$, such as described above. Thus, as a result, the requested torque increase is delivered at 934.

Referring now to FIG. 9C, another non-limiting example of a control process for reaching a desired torque form startup is provided at 936. At 938, at startup, the rotor is locked. To begin rotation, at 940, the current angle is modulated toward the D-axis and, at 942, rotor flux is established or increased as the rotor moves toward the D-axis. At 944, the current angle is modulated toward the Q-axis and this process continues until the desired torque is produced at 946.

Figure 9D:
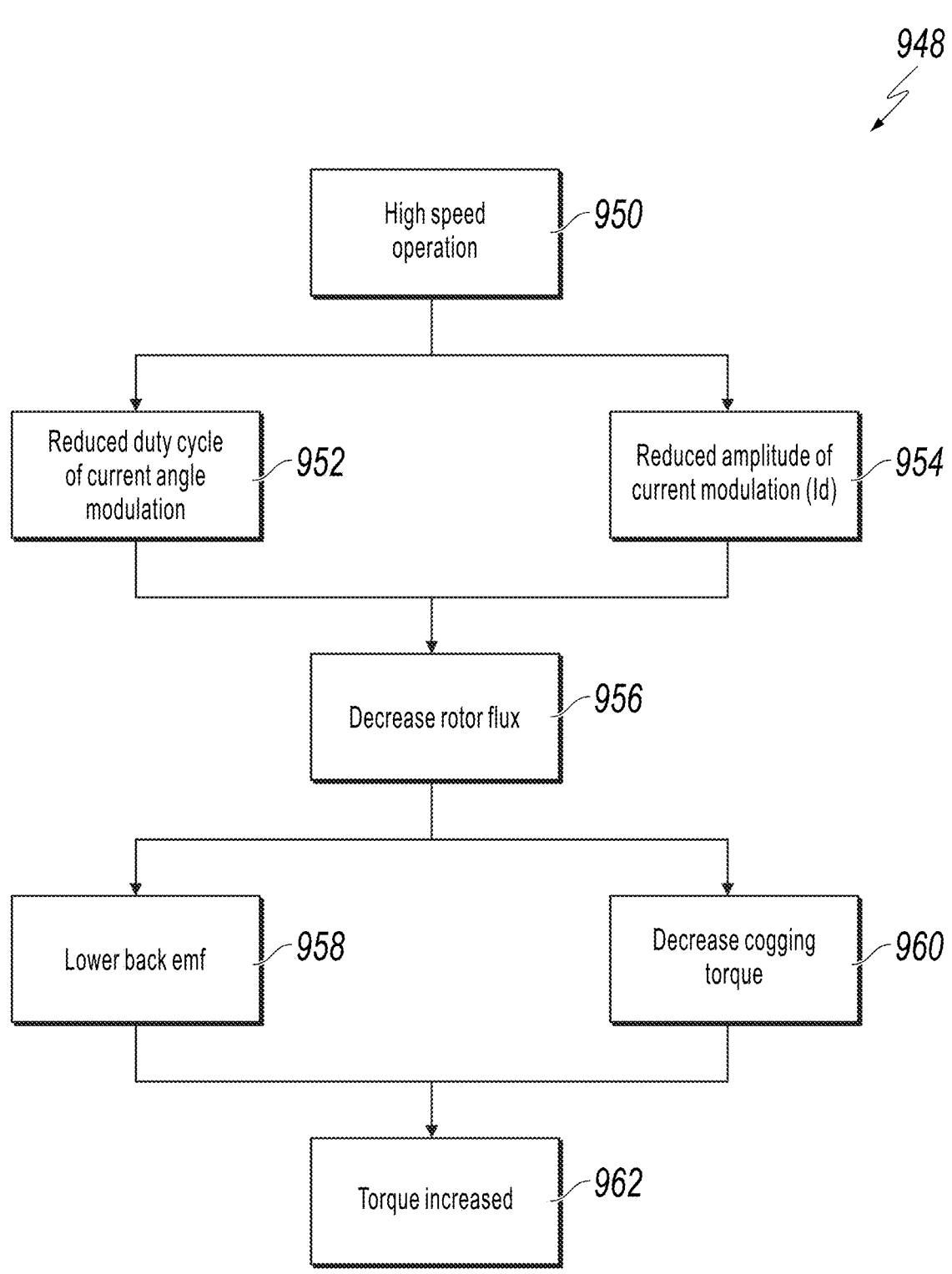
FIG. 9D is a flowchart of a method for responding to a torque increase request in accordance with an aspect of this disclosure.
Figure 10:
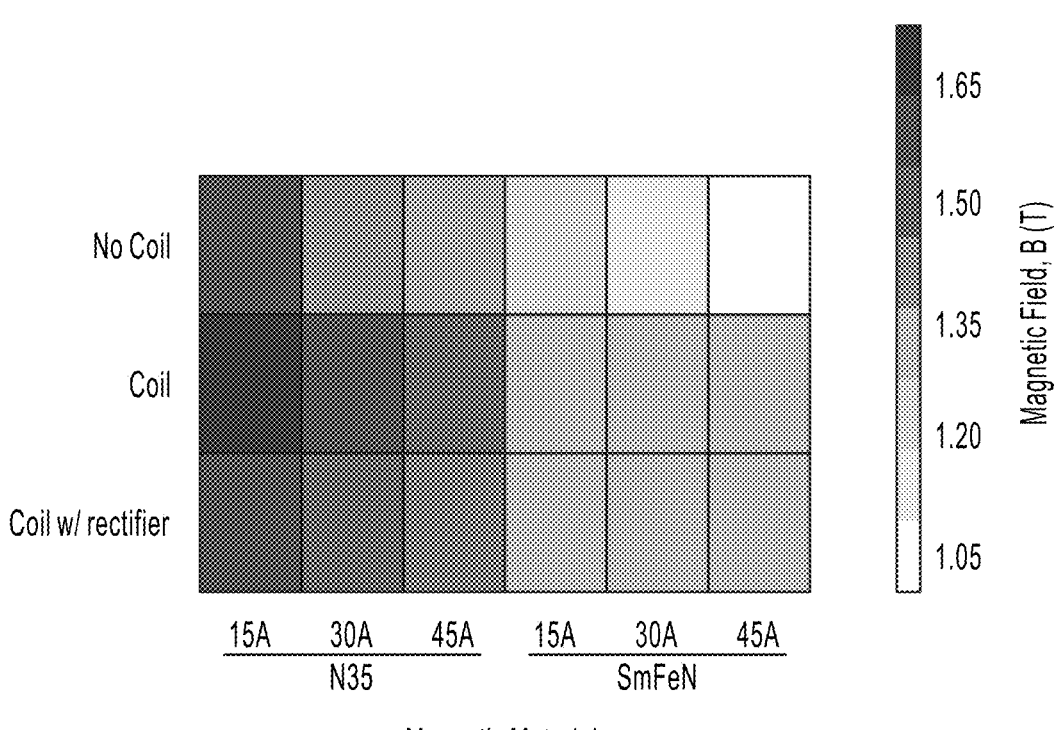
FIG. 10 is a graph of average magnetic field strength for various machine configurations.

FIG. 9D provides still another non-limiting example of a control process for reaching a desired torque at 948. In this case, the process starts with the motor already in high-speed operation 950. At 952, the duty cycle of the current angle modulation is reduced and at 954, the amplitude of the current modulation is reduced. As a result, the rotor flux is decreased at 956. At 958, the back EMF drops and the cogging torque decreases at 960, as the rotor flux decreases. Given the motor's high speed of operation at 950, this control ultimately yields an increase in torque at 962.

Thus, the described systems and method were shown to develop a net increase in torque through sinusoidal excitation due to asymmetric flux vectoring of the rotor field lines along stator D-axis resulting in net rotor field D-Axis current injection. As a result, net D-Axis current injection was capable in traditional circuits with analog circuitry. A machine with the rotor coil structures will saturate less, presenting a net benefit of shorted coil in terms of mean torque generation. The net D-Axis current injection enables greater sheet current density under equivalent stator excitation due to the reactive rotor coil currents.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of controlling an electric machine, the method comprising:
   energizing stator windings of a stator of the electric machine by a stator current;
   producing a stator magnetic field within the stator by the energized stator windings;
   producing a corresponding rotor magnetic field within a ferromagnetic material within a rotor of the electric machine by the stator magnetic field, the rotor defining multiple rotor poles and comprising rotor windings associated with each of the rotor poles;
   generating a force tangential to the rotor by a shift in the stator magnetic field;
   moving the rotor by the generated force tangential to the rotor, wherein the stator magnetic field and the rotor maintain synchronicity with one another during operation of the electric machine;
   reducing a decay of energization of flux in an air gap between the stator and the rotor by a rectifier included in the rotor windings;
   resisting a decay of a magnetic flux within the rotor by current within the rotor windings in response to the shift in the stator magnetic field; and
   achieving a target operational output of the electric machine.

2. The method of claim 1, wherein the electric machine comprises a rectification system comprising a respective rectifier arranged across each of the rotor poles, and
   wherein the rectification system is configured to control against an alternating current being induced in the rotor poles as the corresponding rotor magnetic field is energized by the stator magnetic field.

3. The method of claim 1, wherein reducing the decay of energization of flux in the air gap between the stator and the rotor by the rectifier comprises:
   reducing the decay of energization of flux in the air gap by the rectifier to reduce torque ripple during the operation of the electric machine.

4. The method of claim 1, wherein resistance in flux decay is asymmetric due to an inclusion of the rectifier, and
   wherein a first change of flux is resisted by inducing a first current in a first direction within the rotor windings until the first current decreases to zero, and a second change in flux is enabled to induce a second current in a second direction within the rotor windings.

5. The method of claim 1, further comprising:
   selecting adjustments to at least one of a current angle or a current magnitude to control rotor torque ripple while achieving the target operational output of the electric machine.

6. The method of claim 1, further comprising:
   sending the stator current through the stator at a current angle,
   wherein the current angle is ahead of a rotor pole in a direction of movement or measured relative to a closet one of the rotor poles.

7. The method of claim 1, further comprising:
   adjusting a current angle of the stator current relative to a rotor pole responsive to a change of one or more operating conditions based on the target operational output of the electric machine.

8. The method of claim 7, wherein adjusting the current angle comprises adjusting the current angle on only one axis of the electric machine, and wherein the one axis comprises one of a D-axis or a Q-axis of the electric machine.

9. The method of claim 8, further comprising:

determining a target rotor motion corresponding to the target operational output of the electric machine;

modulating current on the D-axis to control rotor torque ripple while the rotor is performing the target rotor motion; and achieving the target operational output of the electric machine.

10. The method of claim 1, further comprising:

adjusting a current magnitude of the stator current, independently from a current angle of the stator current, responsive to a change of one or more operating conditions based on the target operational output of the electric machine.

11. The method of claim 1, further comprising:

determining a target rotor motion corresponding to the target operational output of the electric machine.

12. The method of claim 11, further comprising:

calculating a vector control modulation applied to the stator that elicits the target rotor motion; and adjusting a current angle of the stator current based on the vector control modulation to cause the rotor to perform the target rotor motion and achieve the target operational output of the electric machine.

13. The method of claim 12, further comprising:

modulating at least one of a magnitude or a frequency of the stator current based on the vector control modulation.

14. The method of claim 11, further comprising:

adjusting at least one of a frequency or an amplitude of the stator current to cause the rotor to perform the target rotor motion; and achieving the target operational output of the electric machine or controlling rotor torque ripple when the rotor is performing the target rotor motion and achieving the target operational output of the electric machine.

15. The method of claim 1, further comprising:

increasing a current angle of the stator current along a winding of the stator ahead of a pole of a rotor to deliver an increased torque to achieve the target operational output of the electric machine; and increasing a magnitude of the stator current while simultaneously increasing the current angle of the stator current to control rotor torque ripple.

16. The method of claim 1, further comprising:

increasing a current angle of the stator to deliver a decreased torque with an increased speed of the rotor to achieve the target operational output of the electric machine.

17. The method of claim 1, further comprising:

causing a current angle of the stator to be negative to deliver a braking function of the rotor to achieve the target operational output of the electric machine.

18. The method of claim 1, further comprising:

in response to determining that a current operation output of the electrical machine is different from the target operational output of the electric machine, iteratively adjusting at least one of a current magnitude of the stator current or a current angle of the stator current until an operation output of the electric machine is identical to the target operational output of the electric machine.

19. The method of claim 1, further comprising:

in response to determining that a current operation output of the electrical machine is identical to the target operational output of the electric machine, operating the electric machine using one or more most-recently adjusted parameters of the stator current, wherein the one or more most-recently adjusted parameters of the stator current comprise at least one of an adjusted current angle or an adjusted current amplitude.

20. An electric machine comprising:

a stator defining multiple stator poles with associated stator windings configured to receive a stator current;

a rotor defining multiple fixed rotor poles with associated rotor windings, wherein the rotor defines a field energizable by magnetic fields produced by the stator windings, responsive to the stator windings receiving the stator current, to produce a relative motion between the rotor and the stator, wherein the rotor is maintained in synchronicity with the magnetic fields produced by the stator during operation of the electric machine; and a controller configured to:

energize the stator windings of the stator by the stator current;

produce a stator magnetic field within the stator by the energized stator windings;

produce a corresponding rotor magnetic field within a ferromagnetic material within the rotor by the stator magnetic field;

generate a force tangential to the rotor by a shift in the stator magnetic field;

move the rotor by the generated force tangential to the rotor;

reduce a decay of energization of flux in an air gap between the stator and the rotor by a rectifier included in the rotor windings;

resist a decay of a magnetic flux within the rotor by current within the rotor windings in response to the shift in the stator magnetic field; and achieve a target operational output of the electric machine.

\* \* \* \* \*